US007965875B2

(12) United States Patent
Ionita et al.

(10) Patent No.: US 7,965,875 B2
(45) Date of Patent: Jun. 21, 2011

(54) ADVANCES IN EXTENDING THE AAM TECHNIQUES FROM GRAYSCALE TO COLOR IMAGES

(75) Inventors: Mircea Ionita, Galway (IE); Peter Corcoran, Claregalway (IE)

(73) Assignees: Tessera Technologies Ireland Limited, Galway (IE); National University of Ireland, Galway (IE)

( * ) Notice: Subject to any disclaimer, the term of this patent is extended or adjusted under 35 U.S.C. 154(b) by 1043 days.

(21) Appl. No.: 11/761,647

(22) Filed: Jun. 12, 2007

(65) Prior Publication Data
US 2008/0013798 A1 Jan. 17, 2008

Related U.S. Application Data

(60) Provisional application No. 60/804,546, filed on Jun. 12, 2006.

(51) Int. Cl.
*G06K 9/00* (2006.01)
(52) U.S. Cl. ........................................................ 382/118
(58) Field of Classification Search ........................ None
See application file for complete search history.

(56) References Cited

U.S. PATENT DOCUMENTS

| | | | |
|---|---|---|---|
| 4,047,187 A | 9/1977 | Mashimo et al. |
| 4,285,588 A | 8/1981 | Mir |
| 4,317,991 A | 3/1982 | Stauffer |
| 4,367,027 A | 1/1983 | Stauffer |
| RE31,370 E | 9/1983 | Mashimo et al. |
| 4,448,510 A | 5/1984 | Murakoshi |
| 4,456,354 A | 6/1984 | Mizokami |
| 4,577,219 A | 3/1986 | Klie et al. |
| 4,638,364 A | 1/1987 | Hiramatsu |
| 4,646,134 A | 2/1987 | Komatsu et al. |
| 4,690,536 A | 9/1987 | Nakai et al. |
| 4,777,620 A | 10/1988 | Shimoni et al. |
| 4,796,043 A | 1/1989 | Izumi et al. |
| 4,881,067 A | 11/1989 | Watanabe et al. |
| 4,970,663 A | 11/1990 | Bedell et al. |
| 4,970,683 A | 11/1990 | Harshaw et al. |
| 4,975,969 A | 12/1990 | Tal |
| 4,978,989 A | 12/1990 | Nakano et al. |
| 5,008,946 A | 4/1991 | Ando |
| 5,016,107 A | 5/1991 | Sasson et al. |

(Continued)

FOREIGN PATENT DOCUMENTS
EP 578508 A2 1/1994
(Continued)

OTHER PUBLICATIONS

Aoki, Hiroyuki et al., "An Image Storage System Using Complex-Valued Associative Memories, Abstract printed from http://csdl.computer.org/comp/proceedings/icpr/2000/0750/02/07502626 abs.htm", International Conference on Pattern Recognition (ICPR '00), 2000, vol. 2.

(Continued)

*Primary Examiner* — Brian P Werner
(74) *Attorney, Agent, or Firm* — Andrew V. Smith

(57) ABSTRACT

A face detection and/or detection method includes acquiring a digital color image. An active appearance model (AAM) is applied including an interchannel-decorrelated color space. One or more parameters of the model are matched to the image. Face detection results based on the matching and/or different results incorporating the face detection result are communicated.

44 Claims, 5 Drawing Sheets

U.S. PATENT DOCUMENTS

| | | | |
|---|---|---|---|
| 5,018,017 A | 5/1991 | Sasaki et al. | |
| RE33,682 E | 9/1991 | Hiramatsu | |
| 5,051,770 A | 9/1991 | Cornuejols | |
| 5,063,603 A | 11/1991 | Burt | |
| 5,070,355 A | 12/1991 | Inoue et al. | |
| 5,111,231 A | 5/1992 | Tokunaga | |
| 5,130,789 A | 7/1992 | Dobbs et al. | |
| 5,130,935 A | 7/1992 | Takiguchi | |
| 5,150,432 A | 9/1992 | Ueno et al. | |
| 5,161,204 A | 11/1992 | Hutcheson et al. | |
| 5,164,831 A | 11/1992 | Kuchta et al. | |
| 5,164,833 A | 11/1992 | Aoki | |
| 5,164,992 A | 11/1992 | Turk et al. | |
| 5,202,720 A | 4/1993 | Fujino et al. | |
| 5,227,837 A | 7/1993 | Terashita | |
| 5,231,674 A | 7/1993 | Cleveland et al. | |
| 5,249,053 A | 9/1993 | Jain | |
| 5,274,457 A | 12/1993 | Kobayashi et al. | |
| 5,278,923 A | 1/1994 | Nazarathy et al. | |
| 5,280,530 A | 1/1994 | Trew et al. | |
| 5,291,234 A | 3/1994 | Shindo et al. | |
| 5,301,026 A | 4/1994 | Lee | |
| 5,303,049 A | 4/1994 | Ejima et al. | |
| 5,305,048 A | 4/1994 | Suzuki et al. | |
| 5,311,240 A | 5/1994 | Wheeler | |
| 5,331,544 A | 7/1994 | Lu et al. | |
| 5,335,072 A | 8/1994 | Tanaka et al. | |
| 5,353,058 A | 10/1994 | Takei | |
| 5,384,601 A | 1/1995 | Yamashita et al. | |
| 5,384,615 A | 1/1995 | Hsieh et al. | |
| 5,384,912 A | 1/1995 | Ogrinc et al. | |
| 5,400,113 A | 3/1995 | Sosa et al. | |
| 5,424,794 A | 6/1995 | McKay | |
| 5,430,809 A | 7/1995 | Tomitaka | |
| 5,432,863 A | 7/1995 | Benati et al. | |
| 5,432,866 A | 7/1995 | Sakamoto | |
| 5,438,367 A | 8/1995 | Yamamoto et al. | |
| 5,450,504 A | 9/1995 | Calia | |
| 5,452,048 A | 9/1995 | Edgar | |
| 5,455,606 A | 10/1995 | Keeling et al. | |
| 5,465,308 A | 11/1995 | Hutcheson et al. | |
| 5,488,429 A | 1/1996 | Kojima et al. | |
| 5,493,409 A | 2/1996 | Maeda et al. | |
| 5,496,106 A | 3/1996 | Anderson | |
| 5,537,516 A | 7/1996 | Sherman et al. | |
| 5,543,952 A | 8/1996 | Yonenaga et al. | |
| 5,568,187 A | 10/1996 | Okino | |
| 5,568,194 A | 10/1996 | Abe | |
| 5,576,759 A | 11/1996 | Kawamura et al. | |
| 5,629,752 A | 5/1997 | Kinjo | |
| 5,633,678 A | 5/1997 | Parulski et al. | |
| 5,638,136 A | 6/1997 | Kojima et al. | |
| 5,638,139 A | 6/1997 | Clatanoff et al. | |
| 5,649,238 A | 7/1997 | Wakabayashi et al. | |
| 5,652,669 A | 7/1997 | Liedenbaum | |
| 5,671,013 A | 9/1997 | Nakao | |
| 5,678,073 A | 10/1997 | Stephenson, III et al. | |
| 5,680,481 A | 10/1997 | Prasad et al. | |
| 5,684,509 A | 11/1997 | Hatanaka et al. | |
| 5,694,926 A | 12/1997 | DeVries et al. | |
| 5,706,362 A | 1/1998 | Yabe | |
| 5,708,866 A | 1/1998 | Leonard | |
| 5,710,833 A | 1/1998 | Moghaddam et al. | |
| 5,715,325 A | 2/1998 | Bang et al. | |
| 5,719,639 A | 2/1998 | Imamura | |
| 5,719,951 A | 2/1998 | Shackleton et al. | |
| 5,721,983 A | 2/1998 | Furutsu | |
| 5,724,456 A | 3/1998 | Boyack et al. | |
| 5,734,425 A | 3/1998 | Takizawa et al. | |
| 5,745,668 A | 4/1998 | Poggio et al. | |
| 5,748,764 A | 5/1998 | Benati et al. | |
| 5,748,784 A | 5/1998 | Sugiyama | |
| 5,751,836 A | 5/1998 | Wildes et al. | |
| 5,761,550 A | 6/1998 | Kancigor | |
| 5,764,790 A | 6/1998 | Brunelli et al. | |
| 5,764,803 A | 6/1998 | Jacquin et al. | |
| 5,771,307 A | 6/1998 | Lu et al. | |
| 5,774,129 A | 6/1998 | Poggio et al. | |
| 5,774,591 A | 6/1998 | Black et al. | |
| 5,774,747 A | 6/1998 | Ishihara et al. | |
| 5,774,754 A | 6/1998 | Ootsuka | |
| 5,781,650 A | 7/1998 | Lobo et al. | |
| 5,802,208 A | 9/1998 | Podilchuk et al. | |
| 5,802,220 A | 9/1998 | Black et al. | |
| 5,805,720 A | 9/1998 | Suenaga et al. | |
| 5,805,727 A | 9/1998 | Nakano | |
| 5,805,745 A | 9/1998 | Graf | |
| 5,812,193 A | 9/1998 | Tomitaka et al. | |
| 5,815,749 A | 9/1998 | Tsukahara et al. | |
| 5,818,975 A | 10/1998 | Goodwin et al. | |
| 5,835,616 A | 11/1998 | Lobo et al. | |
| 5,842,194 A | 11/1998 | Arbuckle | |
| 5,844,573 A | 12/1998 | Poggio et al. | |
| 5,847,714 A | 12/1998 | Naqvi et al. | |
| 5,850,470 A | 12/1998 | Kung et al. | |
| 5,852,669 A | 12/1998 | Eleftheriadis et al. | |
| 5,852,823 A | 12/1998 | De Bonet | |
| RE36,041 E | 1/1999 | Turk et al. | |
| 5,862,217 A | 1/1999 | Steinberg et al. | |
| 5,862,218 A | 1/1999 | Steinberg | |
| 5,870,138 A | 2/1999 | Smith et al. | |
| 5,892,837 A | 4/1999 | Luo et al. | |
| 5,905,807 A | 5/1999 | Kado et al. | |
| 5,911,139 A | 6/1999 | Jain et al. | |
| 5,912,980 A | 6/1999 | Hunke | |
| 5,949,904 A | 9/1999 | Delp | |
| 5,966,549 A | 10/1999 | Hara et al. | |
| 5,974,189 A | 10/1999 | Nicponski | |
| 5,978,519 A | 11/1999 | Bollman et al. | |
| 5,990,973 A | 11/1999 | Sakamoto | |
| 5,991,456 A | 11/1999 | Rahman et al. | |
| 5,991,549 A | 11/1999 | Tsuchida | |
| 5,991,594 A | 11/1999 | Froeber et al. | |
| 5,999,160 A | 12/1999 | Kitamura et al. | |
| 6,006,039 A | 12/1999 | Steinberg et al. | |
| 6,009,209 A | 12/1999 | Acker et al. | |
| 6,011,547 A | 1/2000 | Shiota et al. | |
| 6,016,354 A | 1/2000 | Lin et al. | |
| 6,028,611 A | 2/2000 | Anderson et al. | |
| 6,028,960 A | 2/2000 | Graf et al. | |
| 6,035,072 A | 3/2000 | Read | |
| 6,035,074 A | 3/2000 | Fujimoto et al. | |
| 6,036,072 A | 3/2000 | Lee | |
| 6,053,268 A | 4/2000 | Yamada | |
| 6,061,055 A | 5/2000 | Marks | |
| 6,072,094 A | 6/2000 | Karady et al. | |
| 6,097,470 A | 8/2000 | Buhr et al. | |
| 6,101,271 A | 8/2000 | Yamashita et al. | |
| 6,104,839 A | 8/2000 | Cok et al. | |
| 6,108,437 A | 8/2000 | Lin | |
| 6,115,052 A | 9/2000 | Freeman et al. | |
| 6,118,485 A | 9/2000 | Hinoue et al. | |
| 6,128,397 A | 10/2000 | Baluja et al. | |
| 6,128,398 A | 10/2000 | Kuperstein et al. | |
| 6,134,339 A | 10/2000 | Luo | |
| 6,148,092 A | 11/2000 | Qian | |
| 6,151,073 A | 11/2000 | Steinberg et al. | |
| 6,151,403 A | 11/2000 | Luo | |
| 6,172,706 B1 | 1/2001 | Tatsumi | |
| 6,173,068 B1 | 1/2001 | Prokoski | |
| 6,181,805 B1 | 1/2001 | Koike et al. | |
| 6,188,777 B1 | 2/2001 | Darrell et al. | |
| 6,192,149 B1 | 2/2001 | Eschbach et al. | |
| 6,195,127 B1 | 2/2001 | Sugimoto | |
| 6,201,571 B1 | 3/2001 | Ota | |
| 6,204,858 B1 | 3/2001 | Gupta | |
| 6,204,868 B1 | 3/2001 | Yamauchi et al. | |
| 6,233,364 B1 | 5/2001 | Krainiouk et al. | |
| 6,240,198 B1 | 5/2001 | Rehg et al. | |
| 6,246,779 B1 | 6/2001 | Fukui et al. | |
| 6,246,790 B1 | 6/2001 | Huang et al. | |
| 6,249,315 B1 | 6/2001 | Holm | |
| 6,252,976 B1 | 6/2001 | Schildkraut et al. | |
| 6,263,113 B1 | 7/2001 | Abdel-Mottaleb et al. | |
| 6,266,054 B1 | 7/2001 | Lawton et al. | |
| 6,268,939 B1 | 7/2001 | Klassen et al. | |
| 6,275,614 B1 | 8/2001 | Krishnamurthy et al. | |

| Patent | Date | Inventor |
|---|---|---|
| 6,278,491 B1 | 8/2001 | Wang et al. |
| 6,282,317 B1 | 8/2001 | Luo et al. |
| 6,285,410 B1 | 9/2001 | Marni |
| 6,292,574 B1 | 9/2001 | Schildkraut et al. |
| 6,292,575 B1 | 9/2001 | Bortolussi et al. |
| 6,295,378 B1 | 9/2001 | Kitakado et al. |
| 6,298,166 B1 | 10/2001 | Ratnakar et al. |
| 6,300,935 B1 | 10/2001 | Sobel et al. |
| 6,301,370 B1 | 10/2001 | Steffens et al. |
| 6,301,440 B1 | 10/2001 | Bolle et al. |
| 6,332,033 B1 | 12/2001 | Qian |
| 6,334,008 B2 | 12/2001 | Nakabayashi |
| 6,349,373 B2 | 2/2002 | Sitka et al. |
| 6,351,556 B1 | 2/2002 | Loui et al. |
| 6,381,345 B1 | 4/2002 | Swain |
| 6,393,136 B1 | 5/2002 | Amir et al. |
| 6,393,148 B1 | 5/2002 | Bhaskar |
| 6,396,963 B2 | 5/2002 | Shaffer et al. |
| 6,400,830 B1 | 6/2002 | Christian et al. |
| 6,404,900 B1 | 6/2002 | Qian et al. |
| 6,407,777 B1 | 6/2002 | DeLuca |
| 6,421,468 B1 | 7/2002 | Ratnakar et al. |
| 6,426,775 B1 | 7/2002 | Kurokawa |
| 6,426,779 B1 | 7/2002 | Noguchi et al. |
| 6,429,924 B1 | 8/2002 | Milch |
| 6,433,818 B1 | 8/2002 | Steinberg et al. |
| 6,438,234 B1 | 8/2002 | Gisin et al. |
| 6,438,264 B1 | 8/2002 | Gallagher et al. |
| 6,441,854 B2 | 8/2002 | Fellegara et al. |
| 6,445,810 B2 | 9/2002 | Darrell et al. |
| 6,456,732 B1 | 9/2002 | Kimbell et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,496,655 B1 | 12/2002 | Malloy Desormeaux |
| 6,501,857 B1 | 12/2002 | Gotsman et al. |
| 6,501,911 B1 | 12/2002 | Malloy Desormeaux |
| 6,502,107 B1 | 12/2002 | Nishida |
| 6,504,546 B1 | 1/2003 | Cosatto et al. |
| 6,504,942 B1 | 1/2003 | Hong et al. |
| 6,504,951 B1 | 1/2003 | Luo et al. |
| 6,505,003 B1 | 1/2003 | Malloy Desormeaux |
| 6,510,520 B1 | 1/2003 | Steinberg |
| 6,516,154 B1 | 2/2003 | Parulski et al. |
| 6,526,156 B1 | 2/2003 | Black et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,606,398 B2 | 8/2003 | Cooper |
| 6,614,471 B1 | 9/2003 | Ott |
| 6,614,995 B2 | 9/2003 | Tseng |
| 6,621,867 B1 | 9/2003 | Sazzad et al. |
| 6,628,833 B1 | 9/2003 | Horie |
| 6,633,655 B1 | 10/2003 | Hong et al. |
| 6,661,907 B2 | 12/2003 | Ho et al. |
| 6,678,407 B1 | 1/2004 | Tajima |
| 6,697,503 B2 | 2/2004 | Matsuo et al. |
| 6,697,504 B2 | 2/2004 | Tsai |
| 6,700,614 B1 | 3/2004 | Hata |
| 6,700,999 B1 | 3/2004 | Yang |
| 6,707,950 B1 | 3/2004 | Burns et al. |
| 6,714,665 B1 | 3/2004 | Hanna et al. |
| 6,718,051 B1 | 4/2004 | Eschbach |
| 6,724,941 B1 | 4/2004 | Aoyama |
| 6,728,401 B1 | 4/2004 | Hardeberg |
| 6,747,690 B2 | 6/2004 | Molgaard |
| 6,754,368 B1 | 6/2004 | Cohen |
| 6,754,389 B1 | 6/2004 | Dimitrova et al. |
| 6,760,465 B2 | 7/2004 | McVeigh et al. |
| 6,760,485 B1 | 7/2004 | Gilman et al. |
| 6,765,612 B1 | 7/2004 | Anderson et al. |
| 6,765,686 B2 | 7/2004 | Maruoka |
| 6,778,216 B1 | 8/2004 | Lin |
| 6,786,655 B2 | 9/2004 | Cook et al. |
| 6,792,135 B1 | 9/2004 | Toyama |
| 6,792,161 B1 | 9/2004 | Imaizumi et al. |
| 6,798,834 B1 | 9/2004 | Murakami et al. |
| 6,798,913 B2 | 9/2004 | Toriyama |
| 6,801,250 B1 | 10/2004 | Miyashita |
| 6,801,642 B2 | 10/2004 | Gorday et al. |
| 6,816,156 B2 | 11/2004 | Sukeno et al. |
| 6,816,611 B1 | 11/2004 | Hagiwara et al. |
| 6,829,009 B2 | 12/2004 | Sugimoto |
| 6,850,274 B1 | 2/2005 | Silverbrook et al. |
| 6,859,565 B2 | 2/2005 | Baron |
| 6,873,743 B2 | 3/2005 | Steinberg |
| 6,876,755 B1 | 4/2005 | Taylor et al. |
| 6,879,705 B1 | 4/2005 | Tao et al. |
| 6,885,760 B2 | 4/2005 | Yamada et al. |
| 6,885,766 B2 | 4/2005 | Held et al. |
| 6,895,112 B2 | 5/2005 | Chen et al. |
| 6,900,840 B1 | 5/2005 | Schinner et al. |
| 6,900,882 B2 | 5/2005 | Iida |
| 6,912,298 B1 | 6/2005 | Wilensky |
| 6,934,406 B1 * | 8/2005 | Nakano .................. 382/118 |
| 6,937,773 B1 | 8/2005 | Nozawa et al. |
| 6,937,997 B1 | 8/2005 | Parulski |
| 6,940,545 B1 | 9/2005 | Ray et al. |
| 6,947,601 B2 | 9/2005 | Aoki et al. |
| 6,959,109 B2 | 10/2005 | Moustafa |
| 6,965,684 B2 | 11/2005 | Chen et al. |
| 6,967,680 B1 | 11/2005 | Kagle et al. |
| 6,977,687 B1 | 12/2005 | Suh |
| 6,980,691 B2 | 12/2005 | Nesterov et al. |
| 6,984,039 B2 | 1/2006 | Agostinelli |
| 6,993,157 B1 | 1/2006 | Oue et al. |
| 7,003,135 B2 | 2/2006 | Hsieh et al. |
| 7,020,337 B2 | 3/2006 | Viola et al. |
| 7,024,051 B2 | 4/2006 | Miller et al. |
| 7,024,053 B2 | 4/2006 | Enomoto |
| 7,027,619 B2 | 4/2006 | Pavlidis et al. |
| 7,027,621 B1 | 4/2006 | Prokoski |
| 7,027,662 B2 | 4/2006 | Baron |
| 7,030,927 B2 | 4/2006 | Sasaki |
| 7,034,848 B2 | 4/2006 | Sobol |
| 7,035,456 B2 | 4/2006 | Lestideau |
| 7,035,461 B2 | 4/2006 | Luo et al. |
| 7,035,462 B2 | 4/2006 | White et al. |
| 7,035,467 B2 | 4/2006 | Nicponski |
| 7,038,709 B1 | 5/2006 | Verghese |
| 7,038,715 B1 | 5/2006 | Flinchbaugh |
| 7,039,222 B2 | 5/2006 | Simon et al. |
| 7,042,501 B1 | 5/2006 | Matama |
| 7,042,505 B1 | 5/2006 | DeLuca |
| 7,042,511 B2 | 5/2006 | Lin |
| 7,043,056 B2 | 5/2006 | Edwards et al. |
| 7,043,465 B2 | 5/2006 | Pirim |
| 7,050,607 B2 | 5/2006 | Li et al. |
| 7,057,653 B1 | 6/2006 | Kubo |
| 7,061,648 B2 | 6/2006 | Nakajima et al. |
| 7,062,086 B2 | 6/2006 | Chen et al. |
| 7,064,776 B2 | 6/2006 | Sumi et al. |
| 7,082,212 B2 | 7/2006 | Liu et al. |
| 7,088,386 B2 | 8/2006 | Goto |
| 7,099,510 B2 | 8/2006 | Jones et al. |
| 7,106,374 B1 | 9/2006 | Bandera et al. |
| 7,106,887 B2 | 9/2006 | Kinjo |
| 7,110,569 B2 | 9/2006 | Brodsky et al. |
| 7,110,575 B2 | 9/2006 | Chen et al. |
| 7,113,641 B1 | 9/2006 | Eckes et al. |
| 7,116,820 B2 | 10/2006 | Luo et al. |
| 7,119,838 B2 | 10/2006 | Zanzucchi et al. |
| 7,120,279 B2 | 10/2006 | Chen et al. |
| 7,133,070 B2 | 11/2006 | Wheeler et al. |
| 7,146,026 B2 | 12/2006 | Russon et al. |
| 7,151,843 B2 | 12/2006 | Rui et al. |
| 7,155,058 B2 | 12/2006 | Gaubatz et al. |
| 7,158,680 B2 | 1/2007 | Pace |
| 7,162,076 B2 | 1/2007 | Liu |
| 7,162,101 B2 | 1/2007 | Itokawa et al. |
| 7,171,023 B2 | 1/2007 | Kim et al. |
| 7,171,025 B2 | 1/2007 | Rui et al. |
| 7,171,044 B2 | 1/2007 | Chen et al. |
| 7,190,829 B2 | 3/2007 | Zhang et al. |

| Patent/Pub. No. | Date | Inventor |
|---|---|---|
| 7,194,114 B2 | 3/2007 | Schneiderman |
| 7,200,249 B2 | 4/2007 | Okubo et al. |
| 7,216,289 B2 | 5/2007 | Kagle et al. |
| 7,218,759 B1 | 5/2007 | Ho et al. |
| 7,224,850 B2 | 5/2007 | Zhang et al. |
| 7,227,976 B1 | 6/2007 | Jung et al. |
| 7,254,257 B2 | 8/2007 | Kim et al. |
| 7,269,292 B2 | 9/2007 | Steinberg |
| 7,274,822 B2 | 9/2007 | Zhang et al. |
| 7,274,832 B2 | 9/2007 | Nicponski |
| 7,289,664 B2 | 10/2007 | Enomoto |
| 7,295,233 B2 | 11/2007 | Steinberg et al. |
| 7,306,337 B2 | 12/2007 | Ji et al. |
| 7,310,443 B1 | 12/2007 | Kris et al. |
| 7,315,630 B2 | 1/2008 | Steinberg et al. |
| 7,315,631 B1 | 1/2008 | Corcoran et al. |
| 7,317,815 B2 | 1/2008 | Steinberg et al. |
| 7,321,391 B2 | 1/2008 | Ishige |
| 7,321,670 B2 | 1/2008 | Yoon et al. |
| 7,324,670 B2 | 1/2008 | Kozakaya et al. |
| 7,324,671 B2 | 1/2008 | Li et al. |
| 7,336,821 B2 | 2/2008 | Ciuc et al. |
| 7,336,830 B2 | 2/2008 | Porter et al. |
| 7,352,393 B2 | 4/2008 | Sakamoto |
| 7,352,394 B1 | 4/2008 | DeLuca et al. |
| 7,362,210 B2 | 4/2008 | Bazakos et al. |
| 7,362,368 B2 | 4/2008 | Steinberg et al. |
| 7,369,712 B2 | 5/2008 | Steinberg et al. |
| 7,403,643 B2 | 7/2008 | Ianculescu et al. |
| 7,436,998 B2 | 10/2008 | Steinberg et al. |
| 7,437,998 B2 | 10/2008 | Burger et al. |
| 7,440,593 B1 | 10/2008 | Steinberg et al. |
| 7,454,040 B2 | 11/2008 | Luo et al. |
| 7,460,694 B2 | 12/2008 | Corcoran et al. |
| 7,460,695 B2 | 12/2008 | Steinberg et al. |
| 7,466,866 B2 | 12/2008 | Steinberg |
| 7,469,055 B2 | 12/2008 | Corcoran et al. |
| 7,471,846 B2 | 12/2008 | Steinberg et al. |
| 7,502,494 B2 | 3/2009 | Tafuku et al. |
| 7,536,036 B2 | 5/2009 | Steinberg et al. |
| 7,551,211 B2 | 6/2009 | Taguchi et al. |
| 7,565,030 B2 | 7/2009 | Steinberg et al. |
| 7,574,016 B2 | 8/2009 | Steinberg et al. |
| 7,612,794 B2 | 11/2009 | He et al. |
| 7,616,233 B2 | 11/2009 | Steinberg et al. |
| 7,620,214 B2 | 11/2009 | Chen et al. |
| 7,623,733 B2 | 11/2009 | Hirosawa |
| 7,630,527 B2 | 12/2009 | Steinberg et al. |
| 7,634,109 B2 | 12/2009 | Steinberg et al. |
| 7,636,485 B2 | 12/2009 | Simon et al. |
| 7,652,693 B2 | 1/2010 | Miyashita et al. |
| 7,684,630 B2 | 3/2010 | Steinberg |
| 7,693,311 B2 | 4/2010 | Steinberg et al. |
| 7,702,136 B2 | 4/2010 | Steinberg et al. |
| 7,733,388 B2 | 6/2010 | Asaeda |
| 7,809,162 B2 | 10/2010 | Steinberg et al. |
| 2001/0005222 A1 | 6/2001 | Yamaguchi |
| 2001/0015760 A1 | 8/2001 | Fellegara et al. |
| 2001/0028731 A1 | 10/2001 | Covell et al. |
| 2001/0031142 A1 | 10/2001 | Whiteside |
| 2001/0038712 A1 | 11/2001 | Loce et al. |
| 2001/0038714 A1 | 11/2001 | Masumoto et al. |
| 2001/0052937 A1 | 12/2001 | Suzuki |
| 2002/0019859 A1 | 2/2002 | Watanabe |
| 2002/0041329 A1 | 4/2002 | Steinberg |
| 2002/0051571 A1 | 5/2002 | Jackway et al. |
| 2002/0054224 A1 | 5/2002 | Wasula et al. |
| 2002/0081003 A1 | 6/2002 | Sobol |
| 2002/0085088 A1 | 7/2002 | Eubanks |
| 2002/0090133 A1 | 7/2002 | Kim et al. |
| 2002/0093577 A1 | 7/2002 | Kitawaki et al. |
| 2002/0093633 A1 | 7/2002 | Milch |
| 2002/0102024 A1 | 8/2002 | Jones et al. |
| 2002/0105662 A1 | 8/2002 | Patton et al. |
| 2002/0106114 A1 | 8/2002 | Yan et al. |
| 2002/0114513 A1 | 8/2002 | Hirao |
| 2002/0114535 A1 | 8/2002 | Luo |
| 2002/0118287 A1 | 8/2002 | Grosvenor et al. |
| 2002/0126893 A1 | 9/2002 | Held et al. |
| 2002/0131770 A1 | 9/2002 | Meier et al. |
| 2002/0136433 A1 | 9/2002 | Lin |
| 2002/0136450 A1 | 9/2002 | Chen et al. |
| 2002/0141640 A1 | 10/2002 | Kraft |
| 2002/0141661 A1 | 10/2002 | Steinberg |
| 2002/0150291 A1 | 10/2002 | Naf et al. |
| 2002/0150292 A1 | 10/2002 | O'callaghan |
| 2002/0150306 A1 | 10/2002 | Baron |
| 2002/0150662 A1 | 10/2002 | Dewis et al. |
| 2002/0159630 A1 | 10/2002 | Buzuloiu et al. |
| 2002/0168108 A1 | 11/2002 | Loui et al. |
| 2002/0172419 A1 | 11/2002 | Lin et al. |
| 2002/0176609 A1 | 11/2002 | Hsieh et al. |
| 2002/0176623 A1 | 11/2002 | Steinberg |
| 2002/0181801 A1 | 12/2002 | Needham et al. |
| 2002/0191861 A1 | 12/2002 | Cheatle |
| 2003/0007687 A1 | 1/2003 | Nesterov et al. |
| 2003/0021478 A1 | 1/2003 | Yoshida |
| 2003/0023974 A1 | 1/2003 | Dagtas et al. |
| 2003/0025808 A1 | 2/2003 | Parulski et al. |
| 2003/0025811 A1 | 2/2003 | Keelan et al. |
| 2003/0025812 A1 | 2/2003 | Slatter |
| 2003/0035573 A1 | 2/2003 | Duta et al. |
| 2003/0044063 A1 | 3/2003 | Meckes et al. |
| 2003/0044070 A1 | 3/2003 | Fuersich et al. |
| 2003/0044176 A1 | 3/2003 | Saitoh |
| 2003/0044177 A1 | 3/2003 | Oberhardt et al. |
| 2003/0044178 A1 | 3/2003 | Oberhardt et al. |
| 2003/0048950 A1 | 3/2003 | Savakis et al. |
| 2003/0052991 A1 | 3/2003 | Stavely et al. |
| 2003/0058343 A1 | 3/2003 | Katayama |
| 2003/0058349 A1 | 3/2003 | Takemoto |
| 2003/0059107 A1 | 3/2003 | Sun et al. |
| 2003/0059121 A1 | 3/2003 | Savakis et al. |
| 2003/0068083 A1 | 4/2003 | Lee |
| 2003/0071908 A1 | 4/2003 | Sannoh et al. |
| 2003/0084065 A1 | 5/2003 | Lin et al. |
| 2003/0086134 A1 | 5/2003 | Enomoto |
| 2003/0095197 A1 | 5/2003 | Wheeler et al. |
| 2003/0107649 A1 | 6/2003 | Flickner et al. |
| 2003/0113035 A1 | 6/2003 | Cahill et al. |
| 2003/0117501 A1 | 6/2003 | Shirakawa |
| 2003/0118216 A1 | 6/2003 | Goldberg |
| 2003/0123713 A1 | 7/2003 | Geng |
| 2003/0123751 A1 | 7/2003 | Krishnamurthy et al. |
| 2003/0137597 A1 | 7/2003 | Sakamoto et al. |
| 2003/0142209 A1 | 7/2003 | Yamazaki et al. |
| 2003/0142285 A1 | 7/2003 | Enomoto |
| 2003/0151674 A1 | 8/2003 | Lin |
| 2003/0161506 A1 | 8/2003 | Velazquez et al. |
| 2003/0169907 A1 | 9/2003 | Edwards et al. |
| 2003/0174773 A1 | 9/2003 | Comaniciu et al. |
| 2003/0190072 A1 | 10/2003 | Adkins et al. |
| 2003/0194143 A1 | 10/2003 | Iida |
| 2003/0202715 A1 | 10/2003 | Kinjo |
| 2003/0223622 A1 | 12/2003 | Simon et al. |
| 2004/0001616 A1 | 1/2004 | Gutta et al. |
| 2004/0017481 A1 | 1/2004 | Takasumi et al. |
| 2004/0022435 A1 | 2/2004 | Ishida |
| 2004/0027593 A1 | 2/2004 | Wilkins |
| 2004/0032512 A1 | 2/2004 | Silverbrook |
| 2004/0032526 A1 | 2/2004 | Silverbrook |
| 2004/0033071 A1 | 2/2004 | Kubo |
| 2004/0037460 A1 | 2/2004 | Luo et al. |
| 2004/0041121 A1 | 3/2004 | Yoshida et al. |
| 2004/0041924 A1 | 3/2004 | White et al. |
| 2004/0046878 A1 | 3/2004 | Jarman |
| 2004/0047491 A1 | 3/2004 | Rydbeck |
| 2004/0056975 A1 | 3/2004 | Hata |
| 2004/0057623 A1 | 3/2004 | Schuhrke et al. |
| 2004/0057705 A1 | 3/2004 | Kohno |
| 2004/0057715 A1 | 3/2004 | Tsuchida et al. |
| 2004/0093432 A1 | 5/2004 | Luo et al. |
| 2004/0095359 A1 | 5/2004 | Simon et al. |
| 2004/0114796 A1 | 6/2004 | Kaku |
| 2004/0114797 A1 | 6/2004 | Meckes |
| 2004/0114829 A1 | 6/2004 | LeFeuvre et al. |
| 2004/0114904 A1 | 6/2004 | Sun et al. |
| 2004/0119851 A1 | 6/2004 | Kaku |

| | | | | | | |
|---|---|---|---|---|---|---|
| 2004/0120391 A1 | 6/2004 | Lin et al. | | 2005/0275721 A1 | 12/2005 | Ishii |
| 2004/0120399 A1 | 6/2004 | Kato | | 2005/0275734 A1 | 12/2005 | Ikeda |
| 2004/0120598 A1 | 6/2004 | Feng | | 2005/0276481 A1 | 12/2005 | Enomoto |
| 2004/0125387 A1 | 7/2004 | Nagao et al. | | 2005/0280717 A1 | 12/2005 | Sugimoto |
| 2004/0126086 A1 | 7/2004 | Nakamura et al. | | 2005/0286766 A1 | 12/2005 | Ferman |
| 2004/0141657 A1 | 7/2004 | Jarman | | 2006/0006077 A1 | 1/2006 | Mosher et al. |
| 2004/0150743 A1 | 8/2004 | Schinner | | 2006/0008152 A1 | 1/2006 | Kumar et al. |
| 2004/0160517 A1 | 8/2004 | Iida | | 2006/0008171 A1 | 1/2006 | Petschnigg et al. |
| 2004/0165215 A1 | 8/2004 | Raguet et al. | | 2006/0008173 A1 | 1/2006 | Matsugu et al. |
| 2004/0170397 A1 | 9/2004 | Ono | | 2006/0017825 A1 | 1/2006 | Thakur |
| 2004/0175021 A1 | 9/2004 | Porter et al. | | 2006/0018517 A1 | 1/2006 | Chen et al. |
| 2004/0179719 A1 | 9/2004 | Chen et al. | | 2006/0029265 A1 | 2/2006 | Kim et al. |
| 2004/0184044 A1 | 9/2004 | Kolb et al. | | 2006/0038916 A1 | 2/2006 | Knoedgen et al. |
| 2004/0184670 A1 | 9/2004 | Jarman et al. | | 2006/0039690 A1 | 2/2006 | Steinberg et al. |
| 2004/0196292 A1 | 10/2004 | Okamura | | 2006/0045352 A1 | 3/2006 | Gallagher |
| 2004/0196503 A1 | 10/2004 | Kurtenbach et al. | | 2006/0050300 A1 | 3/2006 | Mitani et al. |
| 2004/0213476 A1 | 10/2004 | Luo et al. | | 2006/0050933 A1 | 3/2006 | Adam et al. |
| 2004/0218832 A1 | 11/2004 | Luo et al. | | 2006/0056655 A1 | 3/2006 | Wen et al. |
| 2004/0223063 A1 | 11/2004 | DeLuca et al. | | 2006/0066628 A1 | 3/2006 | Brodie et al. |
| 2004/0223649 A1 | 11/2004 | Zacks et al. | | 2006/0082847 A1 | 4/2006 | Sugimoto |
| 2004/0227978 A1 | 11/2004 | Enomoto | | 2006/0093212 A1 | 5/2006 | Steinberg et al. |
| 2004/0228505 A1 | 11/2004 | Sugimoto | | 2006/0093213 A1 | 5/2006 | Steinberg et al. |
| 2004/0228542 A1 | 11/2004 | Zhang et al. | | 2006/0093238 A1 | 5/2006 | Steinberg et al. |
| 2004/0233299 A1 | 11/2004 | Ioffe et al. | | 2006/0098867 A1 | 5/2006 | Gallagher |
| 2004/0233301 A1 | 11/2004 | Nakata et al. | | 2006/0098875 A1 | 5/2006 | Sugimoto |
| 2004/0234156 A1 | 11/2004 | Watanabe et al. | | 2006/0098890 A1 | 5/2006 | Steinberg et al. |
| 2004/0239779 A1 | 12/2004 | Washisu | | 2006/0119832 A1 | 6/2006 | Iida |
| 2004/0240747 A1 | 12/2004 | Jarman et al. | | 2006/0120599 A1 | 6/2006 | Steinberg et al. |
| 2004/0258308 A1 | 12/2004 | Sadovsky et al. | | 2006/0133699 A1 | 6/2006 | Widrow et al. |
| 2004/0264744 A1 | 12/2004 | Zhang et al. | | 2006/0140455 A1 | 6/2006 | Costache et al. |
| 2005/0001024 A1 | 1/2005 | Kusaka et al. | | 2006/0147192 A1 | 7/2006 | Zhang et al. |
| 2005/0013479 A1 | 1/2005 | Xiao et al. | | 2006/0150089 A1 | 7/2006 | Jensen et al. |
| 2005/0013602 A1 | 1/2005 | Ogawa | | 2006/0153472 A1 | 7/2006 | Sakata et al. |
| 2005/0013603 A1 | 1/2005 | Ichimasa | | 2006/0177100 A1 | 8/2006 | Zhu et al. |
| 2005/0018923 A1 | 1/2005 | Messina et al. | | 2006/0177131 A1 | 8/2006 | Porikli |
| 2005/0024498 A1 | 2/2005 | Iida et al. | | 2006/0187305 A1 | 8/2006 | Trivedi et al. |
| 2005/0031224 A1 | 2/2005 | Prilutsky et al. | | 2006/0203106 A1 | 9/2006 | Lawrence et al. |
| 2005/0036044 A1 | 2/2005 | Funakura | | 2006/0203107 A1 | 9/2006 | Steinberg et al. |
| 2005/0041121 A1 | 2/2005 | Steinberg et al. | | 2006/0203108 A1 | 9/2006 | Steinberg et al. |
| 2005/0046730 A1 | 3/2005 | Li | | 2006/0204034 A1 | 9/2006 | Steinberg et al. |
| 2005/0047655 A1 | 3/2005 | Luo et al. | | 2006/0204052 A1 | 9/2006 | Yokouchi |
| 2005/0047656 A1 | 3/2005 | Luo et al. | | 2006/0204054 A1 | 9/2006 | Steinberg et al. |
| 2005/0053279 A1 | 3/2005 | Chen et al. | | 2006/0204055 A1 | 9/2006 | Steinberg et al. |
| 2005/0058340 A1 | 3/2005 | Chen et al. | | 2006/0204056 A1 | 9/2006 | Steinberg et al. |
| 2005/0058342 A1 | 3/2005 | Chen et al. | | 2006/0204057 A1 | 9/2006 | Steinberg |
| 2005/0062856 A1 | 3/2005 | Matsushita | | 2006/0204058 A1 | 9/2006 | Kim et al. |
| 2005/0063083 A1 | 3/2005 | Dart et al. | | 2006/0204110 A1 | 9/2006 | Steinberg et al. |
| 2005/0068446 A1 | 3/2005 | Steinberg et al. | | 2006/0210264 A1 | 9/2006 | Saga |
| 2005/0068452 A1 | 3/2005 | Steinberg et al. | | 2006/0215924 A1 | 9/2006 | Steinberg et al. |
| 2005/0069208 A1 | 3/2005 | Morisada | | 2006/0221408 A1 | 10/2006 | Fukuda |
| 2005/0074164 A1 | 4/2005 | Yonaha | | 2006/0227997 A1 | 10/2006 | Au et al. |
| 2005/0074179 A1 | 4/2005 | Wilensky | | 2006/0228037 A1 | 10/2006 | Simon et al. |
| 2005/0078191 A1 | 4/2005 | Battles | | 2006/0245624 A1* | 11/2006 | Gallagher et al. ............ 382/118 |
| 2005/0089218 A1 | 4/2005 | Chiba | | 2006/0257047 A1 | 11/2006 | Kameyama et al. |
| 2005/0104848 A1 | 5/2005 | Yamaguchi et al. | | 2006/0268150 A1 | 11/2006 | Kameyama et al. |
| 2005/0105780 A1 | 5/2005 | Ioffe | | 2006/0269270 A1 | 11/2006 | Yoda et al. |
| 2005/0117132 A1 | 6/2005 | Agostinelli | | 2006/0280380 A1 | 12/2006 | Li |
| 2005/0128518 A1 | 6/2005 | Tsue et al. | | 2006/0285754 A1 | 12/2006 | Steinberg et al. |
| 2005/0129278 A1 | 6/2005 | Rui et al. | | 2006/0291739 A1 | 12/2006 | Li et al. |
| 2005/0129331 A1 | 6/2005 | Kakiuchi et al. | | 2007/0047768 A1 | 3/2007 | Gordon et al. |
| 2005/0134719 A1 | 6/2005 | Beck | | 2007/0053614 A1 | 3/2007 | Mori et al. |
| 2005/0140801 A1 | 6/2005 | Prilutsky et al. | | 2007/0070440 A1 | 3/2007 | Li et al. |
| 2005/0147278 A1 | 7/2005 | Rui et al. | | 2007/0071347 A1 | 3/2007 | Li et al. |
| 2005/0151943 A1 | 7/2005 | Iida | | 2007/0091203 A1 | 4/2007 | Peker et al. |
| 2005/0163498 A1 | 7/2005 | Battles et al. | | 2007/0098303 A1 | 5/2007 | Gallagher et al. |
| 2005/0168965 A1 | 8/2005 | Yoshida | | 2007/0110305 A1 | 5/2007 | Corcoran et al. |
| 2005/0185054 A1 | 8/2005 | Edwards et al. | | 2007/0110417 A1 | 5/2007 | Itokawa |
| 2005/0196067 A1 | 9/2005 | Gallagher et al. | | 2007/0116379 A1 | 5/2007 | Corcoran et al. |
| 2005/0200736 A1 | 9/2005 | Ito | | 2007/0116380 A1 | 5/2007 | Ciuc et al. |
| 2005/0207649 A1 | 9/2005 | Enomoto et al. | | 2007/0122056 A1 | 5/2007 | Steinberg et al. |
| 2005/0212955 A1 | 9/2005 | Craig et al. | | 2007/0133863 A1 | 6/2007 | Sakai et al. |
| 2005/0219385 A1 | 10/2005 | Terakawa | | 2007/0133901 A1 | 6/2007 | Aiso |
| 2005/0219608 A1 | 10/2005 | Wada | | 2007/0154095 A1 | 7/2007 | Cao et al. |
| 2005/0220346 A1 | 10/2005 | Akahori | | 2007/0154096 A1 | 7/2007 | Cao et al. |
| 2005/0220347 A1 | 10/2005 | Enomoto et al. | | 2007/0154189 A1 | 7/2007 | Harradine et al. |
| 2005/0226499 A1 | 10/2005 | Terakawa | | 2007/0160307 A1 | 7/2007 | Steinberg et al. |
| 2005/0232490 A1 | 10/2005 | Itagaki et al. | | 2007/0172126 A1 | 7/2007 | Kitamura |
| 2005/0238230 A1 | 10/2005 | Yoshida | | 2007/0189606 A1 | 8/2007 | Ciuc et al. |
| 2005/0243348 A1 | 11/2005 | Yonaha | | 2007/0189748 A1 | 8/2007 | Drimbarean et al. |

| | | | | | | |
|---|---|---|---|---|---|---|
| 2007/0189757 A1 | 8/2007 | Steinberg et al. | EP | 1288859 A1 | 3/2003 | |
| 2007/0201724 A1 | 8/2007 | Steinberg et al. | EP | 1288860 A1 | 3/2003 | |
| 2007/0201725 A1 | 8/2007 | Steinberg et al. | EP | 1293933 A1 | 3/2003 | |
| 2007/0201726 A1 | 8/2007 | Steinberg et al. | EP | 1296510 A2 | 3/2003 | |
| 2007/0263104 A1 | 11/2007 | DeLuca et al. | EP | 1398733 A1 | 3/2004 | |
| 2007/0263928 A1 | 11/2007 | Akahori | EP | 1441497 A2 | 7/2004 | |
| 2007/0273504 A1 | 11/2007 | Tran | EP | 1453002 A2 | 9/2004 | |
| 2007/0296833 A1 | 12/2007 | Corcoran et al. | EP | 1478169 A2 | 11/2004 | |
| 2008/0002060 A1 | 1/2008 | DeLuca et al. | EP | 1528509 A2 | 5/2005 | |
| 2008/0013799 A1 | 1/2008 | Steinberg et al. | EP | 1626569 A1 | 2/2006 | |
| 2008/0013800 A1 | 1/2008 | Steinberg et al. | EP | 1785914 A1 | 5/2007 | |
| 2008/0019565 A1 | 1/2008 | Steinberg | EP | 1887511 A1 | 2/2008 | |
| 2008/0031498 A1 | 2/2008 | Corcoran et al. | EP | 1429290 B1 | 7/2008 | |
| 2008/0037827 A1 | 2/2008 | Corcoran et al. | GB | 841609 A | 7/1960 | |
| 2008/0037838 A1 | 2/2008 | Ianculescu et al. | GB | 2370438 A1 | 6/2002 | |
| 2008/0037839 A1 | 2/2008 | Corcoran et al. | GB | 2379819 A | 3/2003 | |
| 2008/0037840 A1 | 2/2008 | Steinberg et al. | JP | 3205989 A2 | 9/1991 | |
| 2008/0043121 A1 | 2/2008 | Prilutsky et al. | JP | 4192681 A2 | 7/1992 | |
| 2008/0043122 A1 | 2/2008 | Steinberg et al. | JP | 5260360 A2 | 10/1993 | |
| 2008/0049970 A1 | 2/2008 | Ciuc et al. | JP | 9214839 A2 | 8/1997 | |
| 2008/0055433 A1 | 3/2008 | Steinberg et al. | JP | 2000-134486 A2 | 5/2000 | |
| 2008/0075385 A1 | 3/2008 | David et al. | JP | 2002-247596 A2 | 8/2002 | |
| 2008/0112599 A1 | 5/2008 | Nanu et al. | JP | 2002-271808 A2 | 9/2002 | |
| 2008/0143854 A1 | 6/2008 | Steinberg et al. | JP | 25164475 A2 | 6/2005 | |
| 2008/0144965 A1 | 6/2008 | Steinberg et al. | JP | 26005662 A2 | 1/2006 | |
| 2008/0144966 A1 | 6/2008 | Steinberg et al. | JP | 2006072770 A | 3/2006 | |
| 2008/0175481 A1 | 7/2008 | Petrescu et al. | JP | 26254358 A2 | 9/2006 | |
| 2008/0186389 A1 | 8/2008 | DeLuca et al. | WO | WO9802844 A1 | 1/1998 | |
| 2008/0205712 A1 | 8/2008 | Ionita et al. | WO | WO0076398 A1 | 12/2000 | |
| 2008/0211937 A1 | 9/2008 | Steinberg et al. | WO | WO0133497 A1 | 5/2001 | |
| 2008/0219517 A1 | 9/2008 | Blonk et al. | WO | WO0171421 A1 | 9/2001 | |
| 2008/0232711 A1 | 9/2008 | Prilutsky et al. | WO | WO0192614 A1 | 12/2001 | |
| 2008/0240555 A1 | 10/2008 | Nanu et al. | WO | WO0245003 A1 | 6/2002 | |
| 2008/0266419 A1 | 10/2008 | Drimbarean et al. | WO | WO-02052835 A2 | 7/2002 | |
| 2008/0267461 A1 | 10/2008 | Ianculescu et al. | WO | WO03026278 A1 | 3/2003 | |
| 2008/0292193 A1 | 11/2008 | Bigioi et al. | WO | WO03028377 A1 | 4/2003 | |
| 2008/0316327 A1 | 12/2008 | Steinberg et al. | WO | WO03071484 A1 | 8/2003 | |
| 2008/0316328 A1 | 12/2008 | Steinberg et al. | WO | WO2004034696 A1 | 4/2004 | |
| 2008/0317339 A1 | 12/2008 | Steinberg et al. | WO | WO2005015896 A1 | 2/2005 | |
| 2008/0317357 A1 | 12/2008 | Steinberg et al. | WO | WO2005041558 A1 | 5/2005 | |
| 2008/0317378 A1 | 12/2008 | Steinberg et al. | WO | WO2005076217 A2 | 8/2005 | |
| 2008/0317379 A1 | 12/2008 | Steinberg et al. | WO | WO2005076217 A3 | 8/2005 | |
| 2009/0002514 A1 | 1/2009 | Steinberg et al. | WO | WO2005087994 A1 | 9/2005 | |
| 2009/0003652 A1 | 1/2009 | Steinberg et al. | WO | WO2005109853 A1 | 11/2005 | |
| 2009/0003661 A1 | 1/2009 | Ionita et al. | WO | WO2006011635 A1 | 2/2006 | |
| 2009/0003708 A1 | 1/2009 | Steinberg et al. | WO | WO2006018056 A1 | 2/2006 | |
| 2009/0052749 A1 | 2/2009 | Steinberg et al. | WO | WO2006045441 A1 | 5/2006 | |
| 2009/0052750 A1 | 2/2009 | Steinberg et al. | WO | 2007/095477 A2 | 8/2007 | |
| 2009/0080713 A1 | 3/2009 | Bigioi et al. | WO | 2007/095483 A2 | 8/2007 | |
| 2009/0087030 A1 | 4/2009 | Steinberg et al. | WO | 2007/095553 A2 | 8/2007 | |
| 2009/0141144 A1 | 6/2009 | Steinberg | WO | WO2007128117 A1 | 11/2007 | |
| 2009/0175609 A1 | 7/2009 | Tan | WO | WO-2007142621 A1 | 12/2007 | |
| 2009/0179998 A1 | 7/2009 | Steinberg et al. | WO | 2008/023280 A2 | 2/2008 | |
| 2009/0196466 A1 | 8/2009 | Capata et al. | WO | WO-2008015586 A2 | 2/2008 | |
| 2009/0208056 A1 | 8/2009 | Corcoran et al. | WO | WO-2008015586 A3 | 2/2008 | |
| 2009/0244296 A1 | 10/2009 | Petrescu et al. | WO | WO2008017343 A1 | 2/2008 | |
| 2009/0245693 A1 | 10/2009 | Steinberg et al. | WO | WO-2008018887 A1 | 2/2008 | |
| 2010/0026831 A1 | 2/2010 | Ciuc et al. | WO | 2007/095477 A3 | 7/2008 | |
| 2010/0026832 A1 | 2/2010 | Ciuc et al. | WO | 2007/095553 A3 | 8/2008 | |
| 2010/0026833 A1 | 2/2010 | Ciuc et al. | WO | WO-2008104549 A2 | 9/2008 | |
| 2010/0039525 A1 | 2/2010 | Steinberg et al. | WO | WO2008107002 A1 | 9/2008 | |
| 2010/0053368 A1 | 3/2010 | Nanu et al. | WO | WO2008/023280 A3 | 11/2008 | |
| 2010/0054533 A1 | 3/2010 | Steinberg et al. | WO | WO2009039876 A1 | 4/2009 | |
| 2010/0054549 A1 | 3/2010 | Steinberg et al. | WO | WO2010012448 A2 | 2/2010 | |
| 2010/0092039 A1 | 4/2010 | Steinberg et al. | WO | WO2010017953 A1 | 2/2010 | |
| 2010/0165140 A1 | 7/2010 | Steinberg | WO | WO2010025908 A1 | 3/2010 | |
| 2010/0165150 A1 | 7/2010 | Steinberg et al. | WO | WO2011000841 A1 | 1/2011 | |
| 2010/0188525 A1 | 7/2010 | Steinberg et al. | | | | |
| 2010/0188530 A1 | 7/2010 | Steinberg et al. | | | | |
| 2010/0220899 A1 | 9/2010 | Steinberg et al. | | | | |
| 2010/0271499 A1 | 10/2010 | Steinberg et al. | | | | |
| 2010/0272363 A1 | 10/2010 | Steinberg et al. | | | | |
| 2011/0002545 A1 | 1/2011 | Steinberg et al. | | | | |

FOREIGN PATENT DOCUMENTS

| | | |
|---|---|---|
| EP | 1128316 A1 | 8/2001 |
| EP | 1199672 A2 | 4/2002 |
| EP | 1229486 A1 | 8/2002 |
| EP | 1288858 A1 | 3/2003 |

OTHER PUBLICATIONS

Beraldin, J.A. et al., "Object Model Creation from Multiple Range Images: Acquisition, Calibration, Model Building and Verification, Abstract printed from http://csdl.computer.org/comp/proceedings/nrc/1997/7943/00/79430326abs.htm", International Conference on Recent Advances in 3-D Digital Imaging and Modeling, 1997.

Beymer, David, "Pose-Invariant face Recognition Using Real and Virtual Views, A.I. Technical Report No. 1574", Mass. Inst. of Technology Artificial Intelligence Laboratory, 1996, pp. 1-176.

Bradski Gary et al., "Learning-Based Computer Vision with Intel's Open Source Computer Vision Library", Intel Technology, 2005, pp. 119-130, vol. 9—Issue 2.

Buenaposada, J., "Efficiently estimating 1-3,16 facial expression and illumination in appearance—based tracking, Retrieved from the Internet: http://www.bmva.ac.uk/bmvc/2006/ [retrieved on Sep. 1, 2008]", Proc. British machine vision conf. 2006.

Chang, T., "Texture Analysis and Classification with Tree-Structured Wavelet Transform", IEEE Transactions on Image Processing, 1993, pp. 429-441, vol. 2—Issue 4.

Cootes T. et al., "Modeling Facial Shape and Appearance, S. Li and K. K. Jain (EDS.): "Handbook of face recognition", XP002494037", 2005, Chapter 3, Springer.

Corcoran, P. et al., "Automatic Indexing of Consumer Image Collections Using Person Recognition Techniques", Digest of Technical Papers. International Conference on Consumer Electronics, 2005, pp. 127-128.

Costache, G. et al., "In-Camera Person-Indexing of Digital Images", Digest of Technical Papers. International Conference on Consumer Electronics, 2006, pp. 339-340.

Crowley, J. et al., "Multi-modal tracking of faces for video communication. http://citeseer.ist.psu.edu/crowley97multimodal.html", In Comp Vision and Patent Recognition, 1997.

Dalton, John, "Digital Cameras and Electronic Color Image Acquisition, Abstract printed from http://csdl.computer.org/comp/proceedings/compcon/1996/7414/00/7414043labs.htm", COMPCON Spring '96—41st IEEE International Conference, 1996.

Demirkir, C. et al., "Face detection using boosted tree classifier stages", Proceedings of the IEEE 12th Signal Processing and Communications Applications Conference, 2004, pp. 575-578.

Drimbarean, A.F. et al., "Image Processing Techniques to Detect and Filter Objectionable Images based on Skin Tone and Shape Recognition", International Conference on Consumer Electronics, 2001, pp. 278-279.

Feraud, R. et al., "A Fast and Accurate Face Detector Based on Neural Networks", IEEE Transactions on Pattern Analysis and Machine Intelligence, 2001, pp. 42-53, vol. 23—Issue 1.

Fernandez, Anna T. et al., "Synthetic Elevation Beamforming and Image Acquisition Capabilities Using an 8x 128 1.75D Array, Abstract Printed from http://www.ieee-uffe.org/archive/uffe/trans/toc/abs/03/t0310040.htm", The Technical Institute of Electrical and Electronics Engineers.

Froba, B. et al., "Face detection with the modified census transform". Proceedings of the Sixth IEEE International Conference on Automatic Face and Gesture Recognition, 2004, pp. 91-96.

Froba, B. et al., "Real time face detection, Kauai, Hawai Retrieved from the Internet:URL:http://www.embassi.de/publi/veroeffent/Froeba.pdf [retrieved on Oct. 23, 2007]", Dept. of Applied Electronics, Proceedings of lasted "Signal and Image Processing", 2002, pp. 1-6.

Garnaoui, H.H. et al., "Visual Masking and the Design of Magnetic Resonance Image Acquisition, Abstract printed from http://csdl.computer.org/comp/proceedings/icip/1995/7310/01/73100625abs.htm", International Conference on Image Processing, 1995, vol. 1.

Gaubatz, Matthew et al., "Automatic Red-Eye Detection and Correction", IEEE ICIP, Proceedings 2002 International Conference on Image Processing, 2002, pp. 1-804-1-807, vol. 2-Issue 3.

Hu, Wen-Chen et al., "A Line String Image Representation for Image Storage and Retrieval, Abstract printed from http://csdl.computer.oro/comp/procedings/icmcs/1997/7819/00/78190434abs.htm", International Conference on Multimedia Computing and systems, 1997.

Huang et al., "Image Indexing Using Color Correlograms", Proceedings of the 1997 Conference on Computer Vision and Pattern Recognition (CVPR '97), 1997, pp. 762.

Huang, J. et al., "Detection of human faces using decision trees, http://doLieeecomputersociety.org/10.1109/Recognition", 2nd International Conference on Automatic Face and Gesture Recognition (FG '96), IEEE Xplore, 2001, p. 248.

Huber, Reinhold et al., "Adaptive Aperture Control for Image Acquisition, Abstract printed from http://csdl.computer.org/comp/proceedings/wacv/2002/1858/00/18580320abs.htm. cited by other", Sixth IEEE Workshop on Applications of Computer Vision, 2002.

Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Department of Electrical Engineering, 1996, pp. 1-121, McGill University.

Jones, M et al., "Fast multi-view face detection, http://www.merl.com/papers/docs/TR2003-96.pdf", Mitsubishi Electric Research Lab, 2003, 10 pgs.

Kang, Sing Bing et al., "A Multibaseline Stereo System with Active Illumination and Real-Time Image Acquisition, Abstract printed from http://csdl.computer.org/comp/proceedings/iccv/1995/7042/00/70420088abs.htm", Fifth International Conference on Computer Vision, 1995.

Kita, Nobuyuki et al., "Archiving Technology for Plant Inspection Images Captured by Mobile Active Cameras—4D Visible Memory, Abstract printed from http://csdl.computer.org/comp/proceedings/3dpvt/2002/1521/00/15210208abs.htm", 1st International Symposium on 3D Data Processing Visualization and Transmission (3DPVT '02). 2002.

Kouzani, A.Z., "Illumination-Effects Compensation in Facial Images Systems", Man and Cybernetics, IEEE SMC '99 Conference Proceedings, 1999, pp. VI-840-VI-844, vol. 6.

Kozubek, Michal et al., "Automated Multi-view 3D Image Acquisition in Human Genome Research, Abstract printed from http://csdl.computer.org/comp/proceedings/3pvt/2002/1521/00/15210091abs.htm", 1st International Symposium on 3D Data Processing Visualization and Transmission (3DPVT '02), 2002.

Krishnan, Arun, "Panoramic Image Acquisition, Abstract printed from http://csdl.computer.org/comp/proceedings/cvpr/1996/7258/00/72580379abs.htm", Conference on Computer Vision and Pattern Recognition (CVPR '96). 1996.

Lai, J.H. et al., "Face recognition using holistic Fourier in variant features, http://digitalimaging.inf.brad.ac.uk/publication/pr34-1.pdf.", Pattern Recognition, 2001, pp. 95-109, vol. 34.

Lei et al., "A CBIR Method Based on Color-Spatial Feature", IEEE 10th Ann. Int. Conf., 1999.

Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.

Matkovic, Kresimir et al., "The 3D Wunderkammer an Indexing by Placing Approach to the Image Storage and Retrieval, Abstract printed from http://csdl.computer.org/comp/proceedings/tocg/2003/1942/00/19420034abs.htm", Theory and Practice of Computer Graphics, 2003, University of Birmingham.

Mekuz, N. et al., "Adaptive Step Size Window Matching for Detection", Proceedings of the 18th International Conference on Pattern Recognition, 2006, pp. 259-262, vol. 2.

Mitra, S. et al., "Gaussian Mixture Models Based on the Frequency Spectra for Human Identification and Illumination Classification", Proceedings of the Fourth IEEE Workshop on Automatic Identification Advanced Technologies, 2005, pp. 245-250.

Park, Daechul et al., "Lenticular Stereoscopic Imaging and Displaying Techniques with no Special Glasses, Abstract printed from http://csdl.computer.org/comp/proceedings/icip/1995/7310/03/73103137abs.htm", International Conference on Image Processing, 1995, vol. 3.

PCT International Search Report and Written Opinion of the International Searching Authority or the Declaration, for PCT Application No. PCT/US2006/021393, filed Jun. 2, 2006, paper dated Mar. 29.2007, 12 pgs.

PCT International Search Report and Written Opinion of the International Searching Authority, or the Declaration, for PCT Application No. PCT/US2006/060392, filed Oct. 31, 2006. paper dated Sep. 19, 2008, 9 pgs.

PCT Invitation to Pay Additional Fees and, Where Applicable Protest Fee, for PCT Application No. PCT/EP2008/001578, paper dated Jul. 8, 2008, 5 Pages.

PCT Notification of Transmittal of the International Search Report and the Written Opinion of the International Searching Authority, or the Declaration, for PCT Application No. PCT/EP2007/006540, Nov. 8, 2007. 11 pgs.

PCT Notification of Transmittal of the International Search Report and the Written Opinion of the International Searching Authority, or the Declaration, for PCT Application No. PCT/EP2008/001510, dated May 29, 2008, 13 pages.

PCT Notification of Transmittal of the International Search Report and the Written Opinion of the International Searching Authority, or the Declaration, for PCT Application No. PCT/EP2008/052329, dated Sep. 15, 2008, 12 pages.

Romdhani, S. et al., "Face Identification by Fitting a 3D Morphable Model using linear Shape and Texture Error Functions, XP003018283", European Conference on Computer Vision, 2002, pp. 1-15.

Rowley, Henry A. et al., "Neural network-based face detection, ISSN: 0162-8828, DOI: 10.1109/34.655647, Posted online: Aug. 6, 2002. http://ieeexplore.ieee.org/xpl/freeabs_all.jsp?arnumber-655647andisnumber-14286", IEEE Trans on Pattern Analysis and Machine Intelligence, 1998, pp. 23-38, p. 92, vol. 20—Issue 1.

Ryu, Hanjin et al., "Coarse-to-Fine Classification for Image-Based Face Detection", Image and video retrieval lecture notes in Computer science, 2006, pp. 291-299, vol. 4071, Springer-Verlag.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

Shock, D. et al., "Comparison of Rural Remote Site Production of Digital Images Employing a film Digitizer or a Computed Radiography (CR) System, Abstract printed from http://csdl/computer.org/comp/proceedings/imac/1995/7560/00/75600071abs.htm", 4th International Conference on Image Management and Communication (IMAC '95), 1995.

Sim, T. et al., "The CMU Pose, Illumination, and Expression (PIE) database, Automatic Face and Gesture Recognition". Fifth IEEE Intl. Conf, IEEE Piscataway, NJ, USA. 2002, 6 pages.

Skocaj, Danijel, "Range Image Acquisition of Objects with Non-Uniform Albedo Using Structured Light Range Sensor, Abstract printed from http://csdl.computer.org/comp/proceedings/icpr/2000/0750/01 /07501778abs.htm", International Conference on Pattern Recognition (ICPR '00), 2000, vol. 1.

Smeraldi, F. et al., "Facial feature detection by saccadic exploration of the Gabor decomposition, XP010586874", Image Processing, ICIP 98. Proceedings International Conference on Chicago, IL, USA, IEEE Comput. Soc, 1998, pp. 163-167, vol. 3.

Soriano, M. et al., "Making Saturated Facial Images Useful Again, XP002325961, ISSN: 0277-786X", Proceedings of the Spie, 1999, pp. 113-121, vol. 3826.

Stricker et al., "Similarity of color images", SPIE Proc, 1995. pp. 1-12, vol. 2420.

Sublett, J.W. et al., "Design and Implementation of a Digital Teleultrasound System for Real-Time Remote Diagnosis, Abstract printed from http://csdl.computer.org/comp/proceedings/cbms/1995/7117/00/711 70292abs.htm", Eight Annual IEEE Symposium on Computer-Based Medical Systems (CBMS '95), 1995.

Tang, Yuan Y. et al., "Information Acquisition and Storage of Forms in Document Processing, Abstract printed from http://csdl.computer.org/comp/proceedings/icdar/1997/7898/00/78980170abs.htm", 4th International Conference Document Analysis and Recognition, 1997, vol. I and II.

Tjahyadi et al., "Application of the DCT Energy Histogram for Face Recognition", Proceedings of the 2nd Intl Conference on Information Technology for Application, 2004, pp. 305-310.

Turk, Matthew et al., "Eigenfaces for Recognition", Journal of Cognitive Neuroscience, 1991, 17 pgs, vol. 3—Issue 1.

Twins Crack Face Recognition Puzzle, Internet article http://www.cnn.com/2003/Tech/ptech/03/10/israel.twins.reut/index.html, printed Mar. 10, 2003, 3 pages.

U.S. Appl. No. 11/554,539, filed Oct. 30, 2006, entitled Digital Image Processing Using Face Detection and Skin Tone Information.

Viola, P. et al., "Rapid Object Detection using a Boosted Cascade of Simple Features", Proceedings of the 2001 IEEE Computer Society Conference on Computer Vision and Pattern Recognition, 2001, pp. 1-511-1-518, vol. 1.

Viola, P. et al., "Robust Real-Time Face Detection", International Journal of Computer Vision, 2004, pp. 137-154, vol. 57—Issue 2, Kluwer Academic Publishers.

Vuylsteke, P. et al., "Range Image Acquisition with a Single Binary-Encoded Light Pattern. abstract printed from http://csdl.computer.org/comp/trans/tp/1990/02/i0148abs.htm", IEEE Transactions on Pattern Analysis and Machine Intelligence, 1990, 1 page.

Wan, S.J. et al., "Variance-based color image quantization for frame buffer display", S. K. M. Wong Color Research and Application, 1990. pp. 52-58, vol. 15—Issue 1.

Xin He et al., "Real-Time Human Face Detection in Color Image", International Conference on Machine Learning and Cybernetics. 2003. pp. 2915-2920, vol. 5.

Yang, Ming-Hsuan et al., "Detecting Faces in Images: A Survey. ISSN:0162-8828, http://portal.acm.org/citation.cfm?id=505621andcoll=GUIDEanddl=GUIDEandCFID=680-9268andCFTOKEN=82843223.", IEEE Transactions on Pattern Analysis and Machine Intelligence archive, 2002, pp. 34-58, vol. 24—Issue 1, IEEE Computer Society.

Zhang, Jun et al., "Face Recognition: Eigenface, Elastic Matching, and Neural Nets", Proceedings of the IEEE, 1997, pp. 1423-1435, vol. 85—Issue 9.

Zhao, W. et al., "Face recoginition: A literature survey, ISSN:0360-0300, http://portal.acm.org/citation.cfm?id=954342andcoll=GUIDEanddl=GUIDEandCFID=680-9268andCFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

PCT International Search Report and the Written Opinion of the International Searching Authority, or the Declaration, for PCT Application No. PCT/IB2007/003724, dated Aug. 28, 2008, 9 pages.

Stegmann MB et al., Multi-band modelling of appearance, Image Vision Comput; Image and Vision Computing, Jan. 10, 2003, vol. 21, No. 1, Jan. 10, 2003, pp. 61-67, XP009104697.

Ohta Y-I et al., Color Information for Region Segmentation Computer Graphics and Image Processing, Academic Press. New York, US, vol. 13, No. 3, Jul. 1, 1980, pp. 222-241, XP008026458.

Edwards G J et al., Learning to identify and track faces in image sequences, Automatic Face and Gesture Recognition, 1998. Proceedings. Third IEEE, International Conference on Nara, Japan, Apr. 14-16, 1998, Los Alamitos, CA, USA, IEEE Comput. Soc, US, Apr. 14, 1998, pp. 260-265, XP010277593, ISBN: 978-0-8186-8344-2.

T. F. Cootes and C. J. Taylor, On representing edge structure for model matching, in Proc. IEEE Computer Vision and Pattern Recognition (CVPR'01), 2001, pp. 1114-1119.

T. F. Cootes, G. J. Edwards, and C. J. Taylor, A comparative evaluation of active appearance model algorithms, in Proc. 9th British Machine Vison Conference. British Machine Vision Association, 1998, pp. 680-689.

I. Matthews and S. Baker, Active appearance models revisited, International Journal of Computer Vision, vol. 60, No. 2, pp. 135-164, Nov. 2004, in Press., Retrieved from http://www.ri.cmu.edu/pub_files/pub4/matthews_iain_2004_2/matthews_iain_2004_2.pdf.

G. J. Edwards, T. F. Cootes, and C. J. Taylor, Advances in active appearance models, in International Conference on Computer Vision (ICCV'99), 1999, pp. 137-142.

G. Sharma and H. J. Trussell, Digital color imaging, IEEE Transactions on Image Processing, vol. 6, No. 7, pp. 901-932, 1997. [Online]. Available: citeseer.ist.psu.edu/sharma97digital.html.

Tkalcic, M. and Tasic, J.F., Colour spaces perceptual, historical and applicational background, in IEEE, EUROCON, 2003, Sep. 22-24, 2003, pp. 304-308 vol. 1, ISBN: 0-7803-7763-X.

M. B. Stegmann, B. K. Ersbøll, and R. Larsen, FAME a flexible appearance modelling environment, IEEE Transactions on Medical Imaging, vol. 22, No. 10, pp. 1319-1331, 2003. [Online]. Available: http://www2.imm.dtu.dk/pubdb/p.php?1918.

T. Sim, S. Baker, and M. Bsat, The CMU Pose, Illumination, and Expression (PIE) Database of Human Faces Robotics Institute, Carnegie Mellon University, Pittsburgh, PA, Tech. Report, CMU-RI-TR-01-02, Jan. 2001.

M. M. Nordstrøm, M. Larsen, J. Sierakowski, and M. B. Stegmann, The IMM face database •an annotated dataset of 240 face images, Informatics and Mathematical Modelling, Technical University of Denmark, DTU, Richard Petersens Plads, Building 321, DK•2800 Kgs. Lyngby, Tech. Rep., May 2004. [Online]. Available: http://www2.imm.dtu.dk/pubdb/p.php?3160.

Aziz Umit Batur and Monson H. Hayes, Adaptive Active Appearance Models, IEEE Transactions on Image Processing, vol. 14, No. 11, Nov. 2005, pp. 1707-1721.

Rene' Donner, Michael Reiter, Georg Langs, Philipp Peloschek, and Horst Bischof, Fast Active Appearance Model Search Using Canonical Correlation Analysis, IEEE Transactions on Pattern Analysis and Machine Intelligence, vol. 28, No. 10, Oct. 2006, pp. 1690-1694.

Colin Goodall, Procrustes Methods in the Statistical Analysis of Shape, Journal of the Royal Statistical Society. Series B (Methodological), vol. 53, No. 2, (1991), pp. 285-339, Published by: Blackwell Publishing for the Royal Statistical Society, Stable URL: http://www.jstor.org/stable/2345744, Accessed: Oct. 30, 2008.

Xinwen Hou, Stan Z. Li, Hongjiang Zhang, Qiansheng Cheng, Direct Appearance Models, IEEE, 2001, pp. I-828-I-833.

Jan J. Gerbranos, On the Relationships Between SVD, KLT, and PCA, 1981, Pattern Recognition, vol. 14, Nos. 1-6, pp. 375-381, printed in Great Britain.

Co-pending U.S. Appl. No. 12/790,594, filed May 28, 2010.
Co-pending U.S. Appl. No. 12/825,280, filed Jun. 28, 2010.
Co-pending U.S. Appl. No. 12/843,805, filed Jul. 26, 2010.
Final Office Action mailed Mar. 23, 2010, for U.S. Appl. No. 11/688,236, filed Mar. 19, 2007.
Final Office Action mailed Nov. 18, 2009, for U.S. Appl. No. 11/554,539, filed Oct. 30, 2006.
Final Office Action mailed Oct. 13, 2010, for U.S. Appl. No. 11/765,899, filed Jun. 20, 2007.
Final Office Action mailed Sep. 1, 2010, for U.S. Appl. No. 10/608,784, filed Jun. 26, 2003.
Final Office Action mailed Sep. 22, 2010, for U.S. Appl. No. 11/688,236, filed Mar. 19, 2007.
Final Office Action mailed Sep. 30, 2010, for U.S. Appl. No. 11/624,683, filed Jan. 18, 2007.
Machin, et al., "Real Time Facial Motion Analysis for Virtual Teleconferencing," IEEE, 1996, pp. 340-344.
Ming, et al., "Human Face Orientation Estimation Using Symmetry and Feature Points Analysis," IEEE, 2000, pp. 1419-1422.
Non-Final Office Action mailed Apr. 2, 2010, for U.S. Appl. No. 10/608,784, filed Jun. 26, 2003.
Non-Final Office Action mailed Apr. 30, 2010, for U.S. Appl. No. 11/765,899, filed Jun. 20, 2007.
Non-Final Office Action mailed Aug. 2, 2010, for U.S. Appl. No. 11/688,236, filed Mar. 19, 2007.
Non-Final Office Action mailed Aug. 19, 2009, for U.S. Appl. No. 11/773,815, filed Jul. 5, 2007.
Non-Final Office Action mailed Aug. 20, 2009, for U.S. Appl. No. 11/773,855, filed Jul. 5, 2007.
Non-Final Office Action mailed Jan. 20, 2010, for U.S. Appl. No. 12/262,024, filed Oct. 30, 2008.
Non-Final Office Action mailed Jun. 14, 2010, for U.S. Appl. No. 11/624,683, filed Jan. 18, 2007.
Non-Final Office Action mailed Jun. 16, 2010, for U.S. Appl. No. 12/482,305, filed Jun. 10, 2009.
Non-Final Office Action mailed Jun. 22, 2010, for U.S. Appl. No. 12/055,958, filed Mar. 26, 2008.
Non-Final Office Action mailed Jun. 23, 2010, for U.S. Appl. No. 11/941,956, filed Nov. 18, 2007.
Non-Final Office Action mailed May 12, 2010, for U.S. Appl. No. 11/554,539, filed Oct. 30, 2007.
Non-Final Office Action mailed Sep. 8, 2009, for U.S. Appl. No. 11/688,236, filed Mar. 19, 2007.
Non-Final Office Action mailed Sep. 28, 2010, for U.S. Appl. No. 11/752,925, filed May 24, 2007.
Notice of Allowance mailed Aug. 23, 2010, for U.S. Appl. No. 12/262,024, filed Oct. 30, 2008.
Notice of Allowance mailed Jun. 10, 2010, for U.S. Appl. No. 12/262,024, filed Oct. 30, 2008.
Notice of Allowance mailed Oct. 5, 2010, for U.S. Appl. No. 12/262,071, filed Oct. 30, 2008.
Notice of Allowance mailed Oct. 13, 2010, for U.S. Appl. No. 12/482,305, filed Jun. 10, 2009.
Notice of Allowance mailed Oct. 15, 2010, for U.S. Appl. No. 11/554,539, filed Oct. 30, 2006.
Notice of Allowance mailed Oct. 22, 2010, for U.S. Appl. No. 12/262,061, filed Oct. 30, 2008.
Notice of Allowance mailed Oct. 28, 2010, for U.S. Appl. No. 12/055,958, filed Mar. 26, 2008.
Notice of Allowance mailed Sep. 2, 2010, for U.S. Appl. No. 12/262,071, filed Oct. 30, 2008.
Notice of Allowance mailed Sep. 3, 2010, for U.S. Appl. No. 12/262,061, filed Oct. 30, 2008.
Notice of Allowance mailed Sep. 8, 2010, for U.S. Appl. No. 11/554,539, filed Oct. 30, 2006.
Notice of Allowance mailed Sep. 28, 2009, for U.S. Appl. No. 12/262,037, filed Oct. 30, 2008.
PCT Notification of Transmittal of the International Search Report and the Written Opinion of the International Searching Authority, or the Declaration, for PCT Application No. PCT/EP2009/005461, dated Apr. 20, 2010, 12 pages.
Yao, Christina: "Image Cosmetics: An automatic Skin Exfoliation Framework on Static Images" UCSB Four Eyes Lab Imaging, Interaction, and Innovative Interfaces Publications Thesis, Master of Science in Media Arts and Technology Dec. 2005, pp. 1-83, Retrieved from the Internet: URL: http://ilab.cs.ucsb.edu/publications/YaoMS.pdf.
Co-pending U.S. Appl. No. 12/026,484, filed Feb. 5, 2008.
Co-pending U.S. Appl. No. 12/055,958, filed Mar. 26, 2008.
Co-pending U.S. Appl. No. 12/198,533, filed Aug. 26, 2008.
Co-pending U.S. Appl. No. 12/198,621, filed Aug. 26, 2008.
Co-pending U.S. Appl. No. 12/302,493, filed Nov. 25, 2008.
Co-pending U.S. Appl. No. 12/331,334, filed Dec. 9, 2008.
Co-pending U.S. Appl. No. 12/827,868, filed Jun. 30, 2010.
Co-pending U.S. Appl. No. 12/890,185, filed Sep. 24, 2010.
Co-pending U.S. Appl. No. 12/892,935, filed Sep. 29, 2010.
Co-pending U.S. Appl. No. 12/892,937, filed Sep. 29, 2010.
Co-pending U.S. Appl. No. 12/063,089 US-2009-0263022 A1 Oct. 22, 2009 Petrescu et al.
Final Office Action mailed Apr. 26, 2010, for U.S. Appl. No. 10/773,092, filed Feb. 4, 2004.
Final Office Action mailed Apr. 26, 2010, for U.S. Appl. No. 11/690,834, filed Mar. 25, 2007.
Final Office Action mailed Apr. 26, 2010, for U.S. Appl. No. 11/772,427, filed Feb. 2, 2007.
Final Office Action mailed Apr. 26, 2010, for U.S. Appl. No. 12/035,416, filed Feb. 21, 2008.
Final Office Action mailed Mar. 24, 2010, for U.S. Appl. No. 11/462,035, filed Aug. 2, 2006.
Final Office Action mailed Nov. 9, 2010, for U.S. Appl. No. 11/462,035, filed Aug. 2, 2006.
Final Office Action mailed Nov. 20, 2009, for U.S. Appl. No. 12/192,897, filed Aug. 15, 2008.
Final Office Action mailed Sep. 1, 2009, for U.S. Appl. No. 11/841,855, filed Aug. 20, 2007.
Non-Final Office Action mailed Aug. 30, 2010, for U.S. Appl. No. 11/841,855, filed Aug. 20, 2007.
Non-Final Office Action mailed Aug. 31, 2009, for U.S. Appl. No. 11/462,035, filed Aug. 2, 2006.
Non-Final Office Action mailed Aug. 5, 2010, for U.S. Appl. No. 11/462,035, filed Aug. 2, 2006.
Non-Final Office Action mailed Dec. 7, 2010, for U.S. Appl. No. 12/206,617, filed Sep. 8, 2008.
Non-Final Office Action mailed Jul. 14, 2009, for U.S. Appl. No. 12/192,897, filed Aug. 15, 2008.
Non-Final Office Action mailed Mar. 9, 2010, for U.S. Appl. No. 12/192,897, filed Aug. 15, 2008.
Non-Final Office Action mailed May 3, 2010, for U.S. Appl. No. 12/187,763, filed Aug. 7, 2008.
Non-Final Office Action mailed May 4, 2010, for U.S. Appl. No. 12/192,335, filed Aug. 15, 2008.

Non-Final Office Action mailed Oct. 5, 2009, for U.S. Appl. No. 10/919,226, filed Aug. 16, 2004.
Non-Final Office Action mailed Oct. 7, 2009, for U.S. Appl. No. 12/119,614, filed May 13, 2008.
Non-Final Office Action mailed Oct. 29, 2009, for U.S. Appl. No. 12/194,148, filed Aug. 19, 2008.
Non-Final Office Action mailed Sep. 17, 2010, for U.S. Appl. No. 11/690,834, filed Mar. 25, 2007.
Non-Final Office Action mailed Sep. 21, 2010, for U.S. Appl. No. 10/773,092, filed Feb. 4, 2004.
Notice of Allowance mailed Dec. 17, 2010, for U.S. Appl. No. 11/765,899, filed Jun. 20, 2007.
Notice of Allowance mailed Feb. 1, 2010, for U.S. Appl. No. 10/919,226, filed Aug. 16, 2004.
Notice of Allowance mailed Feb. 19, 2010, for U.S. Appl. No. 12/119,614, filed May 13, 2008.
Notice of Allowance mailed Feb. 19, 2010, for U.S. Appl. No. 12/194,148, filed Aug. 19, 2008.
Notice of Allowance mailed Jun. 27, 2010, for U.S. Appl. No. 12/192,897, filed Aug. 15, 2008.
Notice of Allowance mailed Nov. 18, 2009, for U.S. Appl. No. 11/282,954, filed Nov. 18, 2005.
Notice of Allowance mailed Oct. 22, 2010, for U.S. Appl. No. 12/187,763, filed Aug. 7, 2008.
Notice of Allowance mailed Oct. 28, 2010, for U.S. Appl. No. 12/192,335, filed Aug. 15, 2008.
Notice of Allowance mailed Oct. 28, 2010, for U.S. Appl. No. 11/690,834, filed Mar. 25, 2007.
Patent Abstracts of Japan, publication No. 2000050062, Image Input Device, application No. 10-217124, published Feb. 18, 2000, 1 page.
United Kingdom Search Report dated May 22, 2007, issued in Application No. GB 0701957.3.
U.S. Appl. No. 10/170,511, filed Jun. 12, 2002, inventor Michael J. DeLuca.
U.S. Appl. No. 10/608,772, entitled "Method of improving orientation and color balance of images mages using face detection information", filed Jun. 26, 2003.
U.S. Appl. No. 10/772,767, filed Feb. 4, 2004, by inventors Michael J. DeLuca, et al.
U.S. Appl. No. 11/217,788, filed Aug. 30, 2005, inventors Eran Steinberg, et al.

* cited by examiner

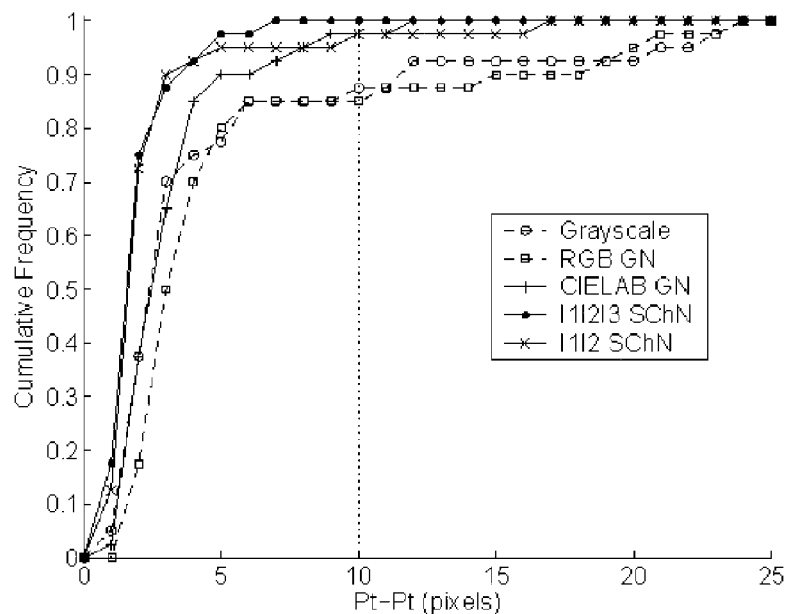
Fig. 3. Cumulative histogram of pointtopoint boundary errors after applying the (PIE) models on PIE Subset 1 (seen images).
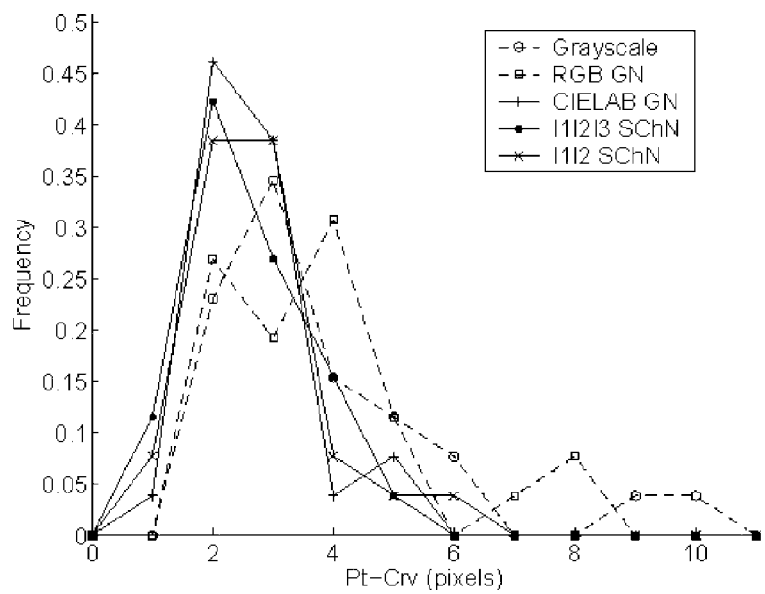
Fig. 4. Histogram of point-to-curve boundary errors after applying the (PIE) models on PIE Subset 2 (unseen images).

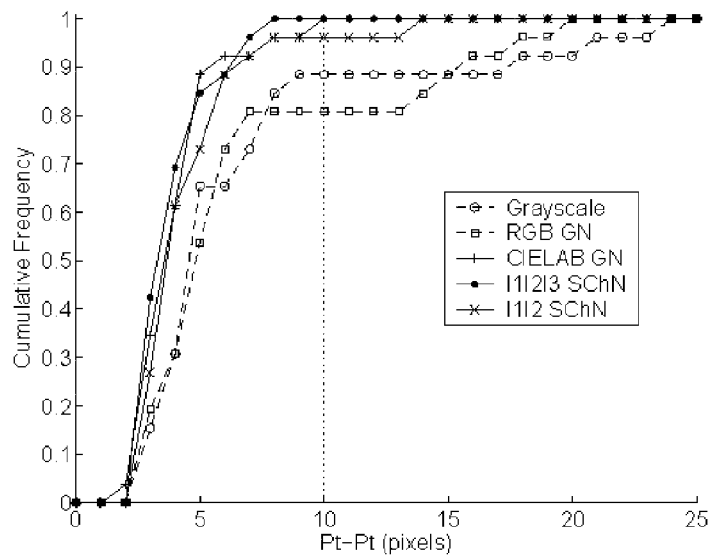
Fig. 5. Cumulative histogram of point-to-point boundary errors after applying the (PIE) models on PIE Subset 2 (unseen images).
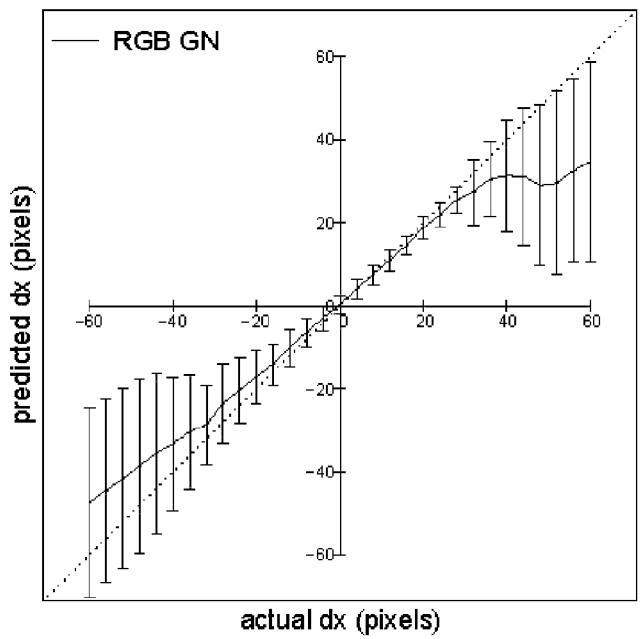
Fig 6. Actual dx vs. predicted dx displacements for (PIE) RGB GN model applied on PIE Subset 2.

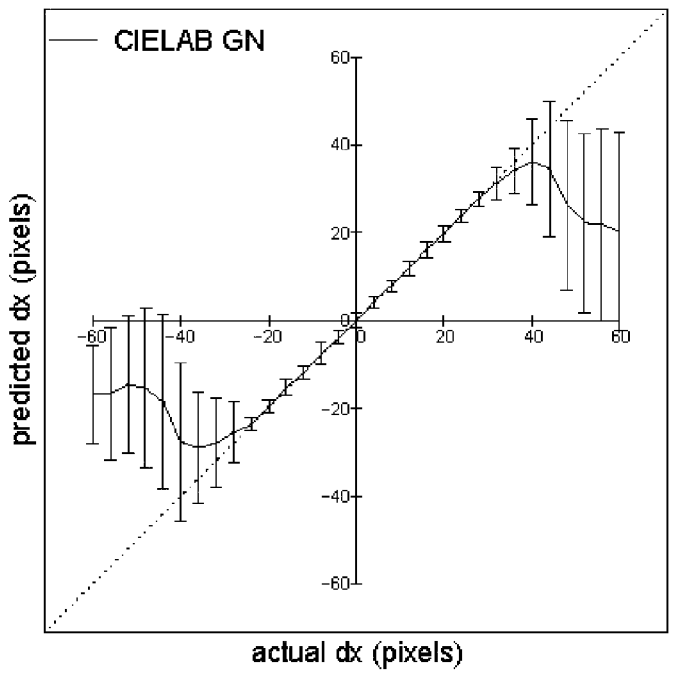
Fig. 7. Actual dx vs. predicted dx displacements for (PIE) CIELAB GN model applied on PIE Subset 2.
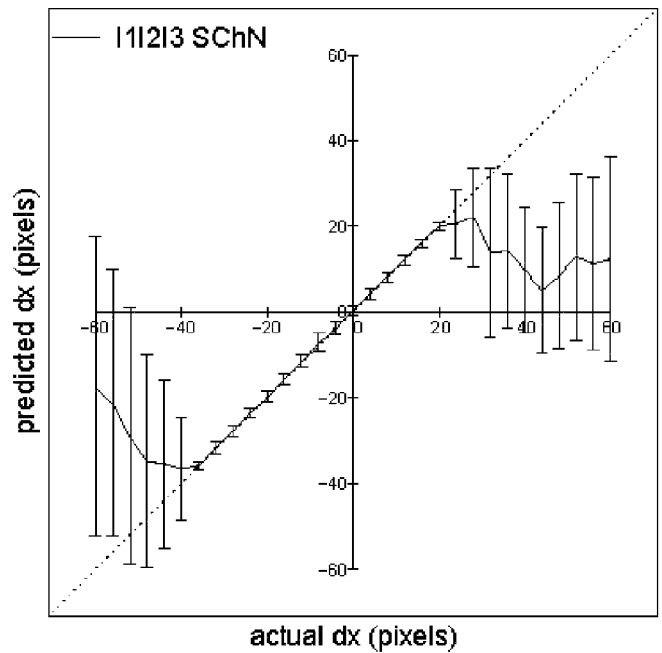
Fig. 8. Actual dx vs. predicted dx displacements for (PIE) I1I2I3 SChN model applied on PIE Subset 2.

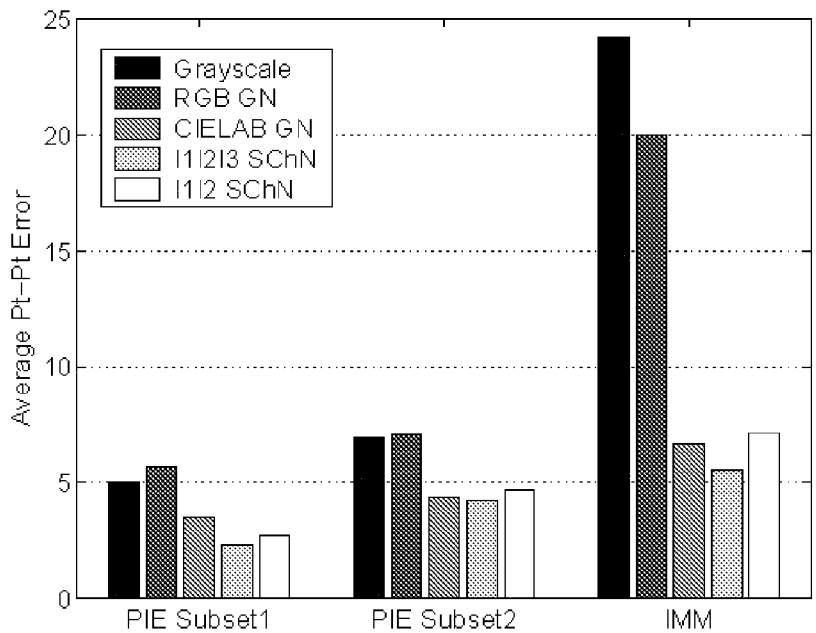
Fig. 9. Comparative average PtPt errors for PIE models applied on three different sets of images.
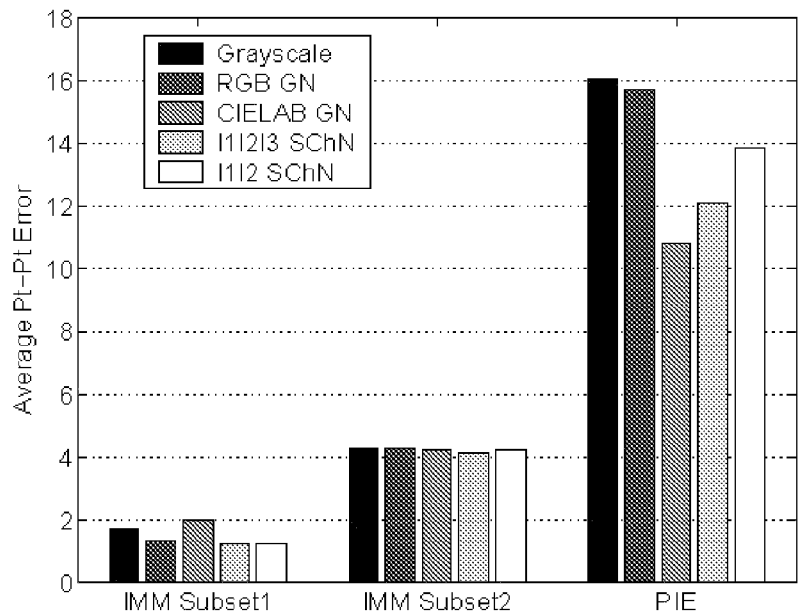
Fig. 10. Comparative average PtPt errors for IMM models applied on three different sets of images.

ADVANCES IN EXTENDING THE AAM TECHNIQUES FROM GRAYSCALE TO COLOR IMAGES

PRIORITY

This application claims priority to United States provisional patent application no. 60/804,546, filed Jun. 12, 2006, entitled "Improved Colour Model for Face Detection and Tracking" which is hereby incorporated by reference.

BACKGROUND

The active appearance model (AAM) techniques were first described by Edwards et al. [1]. They have been extensively used in applications such as face tracking and analysis and interpretation of medical images.

Different derivations of the standard AAM techniques have been proposed for grayscale images in order to improve the convergence accuracy or speed. Cootes et al. proposed in [2] a weighted edge representation of the image structure, claiming a more reliable and accurate fitting than using the standard representation based on normalized intensities. Other derivations include the direct appearance models (DAMs) [3], or the Shape AAMs [4], where the convergence speed is increased by reducing the number of parameters that need to be optimized. In the DAM approach, it is shown that predicting shape directly from texture can be possible when the two are sufficiently correlated. The Shape AAMs use the image residuals for driving the pose and shape parameters only, while the texture parameters are directly estimated by fitting to the current texture.

In [5], a method which uses canonical correlation analysis (CCAAAM) for reducing the dimensionality of the original data instead of the common principal components analysis (PCA) is introduced. This method is claimed to be faster than the standard approach while recording almost equal final accuracy.

An inverse compositional approach is proposed in [6], where the texture warp is composed of incremental warps, instead of using the additive update of the parameters. This method considers shape and texture separately and is shown to increase the AAM fitting efficiency.

Originally designed for grayscale images, AAMs have been later extended to color images. Edwards et al. [7] first proposed a color AAM based on the RGB color space. This approach involves constructing a color texture vector by merging concatenated values of each color channel. However, their results did not indicate that benefits in accuracy could be achieved from the additional chromaticity data which were made available. Furthermore, the extra computation required to process these data suggested that color-based AAMs could not provide useful improvements over conventional grayscale AAMs.

Stegmann et al. [8] proposed a value, hue, edge map (VHE) representation of image structure. They used a transformation to HSV (hue, saturation, and value) color space from where they retained only the hue and value (intensity) components. They added to these an edge map component, obtained using numeric differential operators. A color texture vector was created as in [7], using instead of R, G, and B components the V, H, and E components. In their experiments they compared the convergence accuracy of the VHE model with the grayscale and RGB implementations. Here they obtained unexpected results indicating that the RGB model (as proposed in [7]) was slightly less accurate than the grayscale model. The VHE model outperformed both grayscale and RGB models but only by a modest amount; yet some applicability for the case of directional lighting changes was shown.

SUMMARY OF THE INVENTION

A method of detecting and/or tracking faces in a digital image is provided. The method includes acquiring a digital color image. An active appearance model (AAM) is applied including an interchannel-decorrelated color space. One or more parameters of the model are matched to the image. A face detection result based on the matching and/or a different processing result incorporating the face detection result is communicated.

The method may include converting RGB data to $I_1I_2I_3$ color space. The converting may include linear conversion. Texture may be represented with the $I_1I_2I_3$ color space. The texture may be aligned on separate channels. Operations may be performed on the texture data on each channel separately. The interchannel-decorrleated color space may include at least three channels including a luminance channel and two chromatic channels.

The AAM may include an application of principal components analysis (PCA) which may include eigen-analysis of dispersions of shape, texture and appearance. The AAM may further include an application of generalized procrustes analysis (GPA) including aligning shapes, a model of shape variability including an application of PCA on a set of shape vectors, a normalization of objects within the image with respect to shape and/or generation of a texture model including sampling intensity information from each shape-free image to form a set of texture vectors. The generation of the texture model may include normalization of the set of texture vectors and application of PCA on the normalized texture vectors. The applying may include retaining only the first one or two of the aligned texture vectors. The AAM may also include generation of a combined appearance model including a combined vector from weighted shape parameters concatenated to texture parameters, and application of PCA to the combined vector.

The matching may include a regression approach and/or finding model parameters and/or pose parameters which may include translation, scale and/or rotation.

The interchannel-decorrelated color space may include an orthogonal color space. Effects of global lighting and chrominance variations may be reduced with the AAM. One or more detected faces may be tracked through a series of two of more images.

An apparatus for detecting faces in a digital image is also provided including a processor and one or more processor-readable media for programming the processor to control the apparatus to perform any of the methods described herein.

BRIEF DESCRIPTION OF THE DRAWINGS

FIG. 3 includes histogram plots of point-to-curve boundary errors after applying the (PIE) models on PIE subset 1 (seen images).

FIG. 4 includes histogram plots of point-to-curve boundary errors after applying the (PIE) models on PIE subset 1 (unseen images).

FIG. 5 includes cumulative histogram plots of point-to-curve boundary errors after applying the (PIE) models on PIE subset 1 (unseen images).

FIG. 6 includes a plot of actual dx versus predicted dx displacements for (PIE) RGB GN model applied on PIE subset 2.

FIG. 7 includes a plot of actual dx versus predicted dx displacements for (PIE) CIELAB GN model applied on PIE subset 2.

FIG. 8 includes a plot of actual dx versus predicted dx displacements for (PIE) I1I2I3 SChN model applied on PIE subset 2.

FIG. 9 illustrates comparative average PtPt errors for PIE models applied on three different sets of images.

FIG. 10 illustrates comparative average PtPt errors for IMM models applied on three different sets of images.

DETAILED DESCRIPTION OF THE EMBODIMENTS

Figure 1:
FIGS. 1A-1B include examples of annotated images from PIE database and IMM database, respectively.

A more appropriate extension of active appearance modeling (AAM) techniques to color images is provided. Accordingly, the embodiments are drawn to color spaces other than RGB because intensity and chromaticity information are strongly mixed in each of the R, G and B color channels. By employing color spaces where there is a stronger separation of the chromaticity and intensity information, we have been able to distinguish between intensity-dependent and chromaticity-dependent aspects of a color AAM. This has enabled the development of a new approach for normalizing color texture vectors, performing a set of independent normalizations on the texture subvectors corresponding to each color channel. This approach has enabled the creation of more accurate AAM color models than the conventional grayscale model. An investigation across a number of color spaces indicates that the best performing models are those created in a color space where the three color channels are optimally decorrelated. A performance comparison across the studied color spaces supports these conclusions.

The basic AAM algorithm for grayscale images is briefly described below. Then, extension of this model to RGB color images is analyzed, and a CIELAB-based model is proposed. CIELAB is a perceptually uniform color space that is widely used for advanced image processing applications. Extending the AAMs by applying the texture normalization separately to each component of the color space is also analyzed. The $I_1I_2I_3$ color space, which exhibits substantially optimal decorrelation between the color channels, is shown to be suited to this purpose. The proposed color AAM extension, which realizes a more appropriate texture normalization for color images is also described. Experimental results are shown, and a detailed set of comparisons between the standard grayscale model, the common RGB extension, and our proposed models are provided. Finally, conclusions are presented.

In what follows we frequently use the term texture. In the context of this work, texture is defined as the set of pixel intensities across an object, also subsequent to a suitable normalization.

Overview of the Basic (Grayscale) AAM

The image properties modeled by AAMs are shape and texture. The parameters of the model are estimated from an initial scene and subsequently used for synthesizing a parametric object image. In order to build a statistical model of the appearance of an object a training dataset is used to create (i) a shape model, (ii) a texture model and then (iii) a combined model of appearance by means of PCA, that is an eigenanalysis of the distributions of shape, texture and appearance. The training dataset contains object images, or image examples, annotated with a fixed set of landmark points. These are the training examples. The sets of 2D coordinates of the landmark points define the shapes inside the image frame. These shapes are aligned using the generalized Procrustes analysis (GPA) [9], a technique for removing the differences in translation, rotation and scale between the training set of shapes. This technique defines the shapes in the normalized frame. These aligned shapes are also called the shape examples.

Let N be the number of training examples. Each shape example is represented as a vector s of concatenated coordinates of its points $(x_1, x_2, \ldots, x_L, y_1, y_2, \ldots, y_L)^T$, where L is the number of landmark points. PCA is then applied to the set of aligned shape vectors reducing the initial dimensionality of the data. Shape variability is then linearly modeled as a base (mean) shape plus a linear combination of shape eigenvectors.

$$S_m = \bar{s} + \Phi_s b_s, \quad (1)$$

where $s_m$ represents a modeled shape, $\bar{s}$ the mean of the aligned shapes, $\Phi_s = ((\phi_{s1}|\phi_{s2}| \ldots |\phi_{sp})$ is a matrix having p shape eigenvectors as its columns (p<N), and finally, $b_s$ defines the set of parameters of the shape model. p is chosen so that a certain percentage of the total variance of the data is retained. The corresponding texture model is next constructed. For that, a reference shape is needed in order to acquire a set of so-called texture examples. The reference shape is usually chosen as the point-wise mean of the shape examples. The texture examples are defined in the normalized frame of the reference shape. Each image example is then warped (distorted) such that the points that define its attached shape (used as control points) match the reference shape; this is usually realized by means of a fast triangulation algorithm. Thus, the texture across each image object is mapped into its shape-normalized representation. All shape differences between the image examples are now removed. The resulting images are also called the image examples in the normalized frame. For each of these images, the corresponding pixel values across their common shape are scanned to form the texture vectors $t_{im} = (t_{im1}, t_{im2}, \ldots, t_{imp})^T$, where P is the number of texture samples.

Each texture vector $t_{im}$ is further aligned with respect to intensity values, as detailed below, in order to minimize the global lighting variations. This global texture normalization is designed so that each normalized texture vector is aligned as closely as possible to the mean of the normalized texture vectors.

PCA is next applied to the set of normalized vectors, reducing thus the dimensionality of the texture data. The texture model is also a linear model, a texture instance being obtained from a base (mean) texture plus a linear combination of texture eigenvectors. Thus, $$t_m = \bar{t} + \Phi_t b_t, \quad (2)$$

Similar to the shape model, $t_m$ represents a synthesized (modeled) texture in the normalized texture frame, $\bar{t}$ is the mean normalized texture, $\Phi_t = ((\phi_{t1}|\phi_{t2}| \ldots |\phi_{tq})$ is a matrix having q texture eigenvectors as its columns, with q<N chosen so that a certain percentage from the total variance of the texture data is retained, and $b_t$ defines the set of parameters of the texture model.

A vector c is further formed by concatenating the shape and texture parameters which optimally describe each of the training examples, $$\begin{pmatrix} W_s b_s \\ b_t \end{pmatrix};$$

$W_s$ is a diagonal matrix of (normally equal) weights, applied in order to correct the differences in units between the shape and texture parameters.

A model for which the concatenated shape and texture parameters c are used to describe the appearance variability is called an independent model of appearance. A more compact model may be obtained by considering that some correlation exists between shape and texture. Thus, a third PCA is applied on the set of vectors c, resulting in a combined model of appearance $$c_m = \Phi_c b_c, \quad (3)$$

where $\Phi_c$ is the matrix of retained eigenvectors and $b_c$ represents the set of parameters that provide combined control of shape and texture variations. This reduces the total number of parameters of the appearance model.

During the optimization stage of an AAM (fitting the model to a query image), the parameters to be found are $$p = \begin{pmatrix} g_s \\ b_c \end{pmatrix},$$

where $g_s$ are the shape 2D position, 2D rotation and scale parameters inside the image frame, and $b_c$ are the combined model parameters.

The optimization of the parameters p is realized by minimizing the reconstruction error between the query image and the modeled image. The error is evaluated in the coordinate frame of the model, i.e., in the normalized texture reference frame, rather than in the coordinate frame of the image. This choice enables a fast approximation of a gradient descent optimization algorithm, described below. The difference between the query image and the modeled image is thus given by the difference between the normalized image texture and the normalized synthesized texture, $$r(p) = t - t_m, \quad (4)$$

and $\|r(p)\|^2$ is the reconstruction error, with $\|.\|$ marking the Euclidean norm.

A first order Taylor extension of r(p) is given by $$r(p + \delta p) \simeq r(p) + \frac{\partial r}{\partial p} \delta p. \quad (5)$$

$\partial p$ should be chosen so that to minimize $\|r(p+\partial P)\|^2$ It follows that $$\frac{\partial r}{\partial p} \delta p = -r(p). \quad (6)$$

Normally, the gradient matrix $\|r/\|p$ should be recomputed at each iteration. Yet, as the error is estimated in a normalized texture frame, this gradient matrix may be considered as fixed. This enables it to be pre-computed from the training dataset. Given a training image, each parameter in p is systematically displaced from its known optimal value retaining the normalized texture differences. The resulted matrices are then averaged over several displacement amounts and over several training images.

The update direction of the model parameters p is then given by $$\delta p = -Rr(p), \quad (7)$$

where $$R = \left( \frac{\partial r^T}{\partial p} \frac{\partial r}{\partial p} \right)^{-1} \frac{\partial r^T}{\partial p}$$

is the pseudo-inverse of the determined gradient matrix, which can be pre-computed as part of the training stage. The parameters p continue to be updated iteratively until the error can no longer be reduced and convergence is declared.

The Texture Normalization Stage

As noted also by Batur et al. [10], and confirmed by our experiments, this stage is preferred during the optimization process, providing enhanced chances for predicting a correct update direction of the parameter vector ($\partial p$).

Texture normalization is realized by applying to the texture vector $t_{im}$ a scaling $\alpha$, and an offset $\beta$, being thus a linear normalization, $$t = \frac{t_{im} - \beta 1}{\alpha}, \quad (8)$$

where 1 is the unity matrix.

The values for $\alpha$ and $\beta$ are chosen to best match the current vector to the mean vector of the normalized data. In practice, the mean normalized texture vector is offset and scaled to have zero-mean and unit-variance. If $$\frac{1}{N} \sum_{i=1}^{N} t_i$$

is the mean vector of the normalized texture data, let $t_{zm,uv}$ be its zero-mean and unit-variance correspondent. Then, the values for $\alpha$ and $\beta$ required to normalize a texture vector $t_{im}$, according to (8), are given by $$\alpha = t_{im}^T \bar{t}_{zm,uv}, \quad (9)$$

$$\beta = \frac{t_{im}^T 1}{P}. \quad (10)$$

Obtaining the mean of the normalized data is thus a recursive process. A stable solution can be found by using one texture vector as the first estimate of the mean. Each texture vector is then aligned to zero mean and unit variance mean vector as described in (8)-(10), re-estimating the mean and iteratively repeating these steps until convergence is achieved.

Color AAM Extensions Based on Global ColorTexture Normalization

It is to be expected that using the complete color information will lead to an increased accuracy of AAM fitting. Yet, previous extensions of AAMs to color images showed only modest improvements, if any, in the convergence accuracy of the model. Before investigating this further, we first present the common AAM extension method to color images. We also propose a variant of this method based on a CIELAB color space representation instead of the initial RGB representation.

RGB is by far the most widely used color space in digital images [11]. The extension proposed by Edwards et al. [7] is realized by using an extended texture vector given by $$t_{im}^{RGB} = \left(t_{im_1}^R, t_{im_2}^R, \ldots, t_{im_{P_o}}^R, t_{im_1}^G, t_{im_2}^G, \ldots, t_{im_{P_o}}^G, t_{im_1}^B, t_{im_2}^B, \ldots, t_{im_{P_o}}^B\right)^T, \quad (11)$$

where $P_c$ is the number of texture samples corresponding to one channel. Let $P=3P_c$ denote now the number of elements of the full color texture vector.

In order to reduce the effects of global lighting variations, the same normalization method as for the grayscale model, described above, is applied on the full color texture vectors, $$t_{im}^{RGB} \rightarrow t^{RGB} \quad (12)$$

The remaining steps of the basic grayscale algorithm remain unchanged.

CIELAB Extension

CIELAB is a device-independent, perceptually linear color space which realizes a separation of color information into an intensity, or luminance component (L) and two chromaticity components (a, b). CIELAB was designed to mimic the human perception of the differences between colors. It is defined in terms of a transformation from CIE XYZ, which is a device-independent color space describing the average human observer. CIE XYZ is thus an intermediate space in the RGB to CIELAB conversion (RGB→XYZ→CIELAB).

The distance between two colors in the CIELAB color space is given by the Euclidean distance, $$\Delta E = \sqrt{(\Delta L)^2 + (\Delta a)^2 + (\Delta b)^2} \quad (13)$$

CIELAB uses thus the same metric as RGB, and a CIELAB model implementation can be designed simply by substituting in (11) the values corresponding to the R, G, and B components with the values corresponding to the L, a, and b components, respectively. The color texture vector is thus built as $$t_{im}^{CIELAB} = \left(t_{im_1}^L, t_{im_2}^L, \ldots, t_{im_{P_o}}^L, t_{im_1}^a, t_{im_2}^a, \ldots, t_{im_{P_o}}^a, t_{im_1}^b, t_{im_2}^b, \ldots, t_{im_{P_o}}^b\right)^T. \quad (14)$$

Again, the same normalization technique can be applied on the resulted color vectors, $$t_{im}^{CIELAB} \rightarrow T^{cielab}. \quad (15)$$

The CIELAB AAM implementation is interesting as it offers the possibility for a more accurate image reconstruction, aimed towards a human observer. The benefits of this can clearly be noticed when the model is built using a specific image database and tested on another database with different image acquisition attributes (e.g. different illumination conditions). Considering that the image is typically represented in the more common RGB color space, the application of the CIELAB model may be realized at the expense of the added computational cost introduced by the conversion to CIELAB representation.

Texture Normalization on Separate Channel Subvectors

When a typical multi-channel image is represented in a conventional color space such as RGB, there are correlations between its channels. Channel decorrelation refers to the reduction of the cross correlation between the components of a color image in a certain color space representation. In particular, the RGB color space presents very high inter-channel correlations. For natural images, the cross-correlation coefficient between B and R channels is ~0.78, between R and G channels is ≈0.98, and between G and B channels is ≈0.94 [12]. This implies that, in order to process the appearance of a set of pixels in a consistent way, one must process the color channels as a whole and it is not possible to independently analyze or normalize them.

This observation suggest an explanation as to why previous authors [7] obtained poor results being compelled to treat the RGB components as a single entity. Indeed, if one attempts to normalize individual image channels within a highly correlated color space such as RGB, the performance of the resulting model does not improve when compared with a global normalization applied across all image channels. In a preferred embodiment, however, each image channel is individually normalized when it is substantially decorrelated from the other image channels, and thus an improved color AAM is realized.

There are several color spaces which were specifically designed to separate color information into intensity and chromaticity components. However such a separation still does not necessarily guarantee that the image components are strongly decorrelated. There is though a particular color space which is desirable for substantially optimal image channel decorrelation.

A Decorrelated Color Space

An interesting color space is $I_1I_2I_3$, proposed by Ohta et al. [13], which realizes a statistical minimization of the inter-channel correlations (decorrelation of the RGB components) for natural images. The conversion from RGB to $I_1I_2I_3$ is given by the linear transformation in (16).

$$I_1 = \frac{R + G + B}{3}, \quad (16a)$$

$$I_2 = \frac{R - B}{2}, \quad (16b)$$

$$I_3 = \frac{2G - R - B}{4}. \quad (16c)$$

Similar to the CIELAB color space, $I_1$ stands as the achromatic (intensity) component, while $I_2$ and $I_3$ are the chromatic components. The numeric transformation from RGB to $I_1I_2I_3$ enables efficient transformation of datasets between these two color spaces.

$I_1I_2I_3$ was designed as an approximation for the Karhunen Loéve transform (KLT) of the RGB data to be used for region segmentation on color images. The KLT is optimal in terms of energy compaction and mean squared error minimization for a truncated representation. Note that KLT is very similar to PCA. In a geometric interpretation, KLT can be viewed as a rotation of the coordinate system, while for PCA the rotation of the coordinate system is preceded by a shift of the origin to the mean point [14]. By applying KLT to a color image, it creates image basis vectors which are orthogonal, and it thus achieves complete decorrelation of the image channels. As the transformation to $I_1I_2I_3$ represents a good approximation of the KLT for a large set of natural images, the resulting color channels are almost completely decorrelated. The $I_1I_2I_3$ color space is thus useful for applying color image processing operations independently to each image channel.

In the previous work of Ohta et al., the discriminating power of 109 linear combinations of R, G, and B were tested on eight different color scenes. The selected linear combinations were gathered such that they could successfully be used for segmenting important (large area) regions of an image, based on a histogram threshold. It was found that 82 of the linear combinations had all positive weights, corresponding mainly to an intensity component which is best approximated by $I_1$. Another 22 showed opposite signs for the weights of R and B, representing the difference between the R and B components which are best approximated by $I_2$. Finally, the remaining 4 linear combinations could be approximated by $I_3$. Thus, it was shown that the $I_1$, $I_2$, and $I_3$ components in (16) are effective for discriminating between different regions and that they are significant in this order [13]. Based on the above figures, the percentage of color features which are well discriminated on the first, second, and third channel is around 76.15%, 20.18%, and 3.67%, respectively.

$I_1I_2I_3$ Based Color AAM

An advantage of this representation is that the texture alignment method used for grayscale models can now be applied independently to each channel. By considering the band subvectors individually, the alignment method described above can be independently applied to each of them as $$(t^{I_1}_{im_1}, t^{I_1}_{im_2}, \ldots, t^{I_1}_{im_{P_o}}) \rightarrow (t^{I_1}_1, t^{I_1}_2, \ldots, t^{I_1}_{P_o}), \quad (17a)$$

$$(t^{I_2}_{im_1}, t^{I_2}_{im_2}, \ldots, t^{I_2}_{im_{P_o}}) \rightarrow (t^{I_2}_1, t^{I_2}_2, \ldots, t^{I_2}_{P_o}), \quad (17b)$$

$$(t^{I_3}_{im_1}, t^{I_3}_{im_2}, \ldots, t^{I_3}_{im_{P_o}}) \rightarrow (t^{I_3}_1, t^{I_3}_2, \ldots, t^{I_3}_{P_o}). \quad (17c)$$

The color texture vector is then rebuilt using the separately normalized components into the full normalized texture vector, $$t^{I_1I_2I_3} = (t^{I_1}_1, t^{I_1}_2, \ldots, t^{I_1}_{P_c}, t^{I_1}_1, t^{I_2}_2, \ldots, t^{I_2}_{P_o}, t^{I_8}_1, t^{I_8}_2, \ldots, t^{I_8}_{P_o})^T. \quad (18)$$

In this way, the effect of global lighting variation is reduced due to the normalization on the first channel which corresponds to an intensity component. Furthermore, the effect of some global chromaticity variation is reduced due to the normalization operations applied on the other two channels which correspond to the chromatic components. Thus, the AAM search algorithm becomes more robust to variations in lighting levels and color distributions.

This also addresses a further issue with AAMs which is their dependency on the initial training set of images. For example, if an annotated training set is prepared using a digital camera with a color gamut with extra emphasis on "redness" (some manufacturers do customize their cameras according to market requirements), then the RGB-based AAM will perform poorly on images captured with a camera which has a normal color balance. A model, built using multi-channel normalization, is noticeably more tolerant to such variations in image color balance.

During the optimization process, the overall error function $\|r(p)\mu^2$ is replaced by the weighted error function $$\sum_{i=1}^{3} w_i \|r(p)\|^2.$$

The set of weights that correspond to each color channel should be chosen so as to best describe the amount of information contained in that particular image channel. Evidently this is dependent on the current color space representation. For the $I_1I_2I_3$ color space, the percentages of color features found to be well discriminated for each channel were given above. Note that these percentages can also serve as estimates of the amount of information contained in each channel. Thus, they can provide a good choice for weighting the overall error function. The relative weighting of the error function may be used for texture normalization on separate channel sub-vectors.

As remarked also in [8], the common linear normalization applied on concatenated RGB bands as realized in the RGB implementation is less than optimal. An $I_1I_2I_3$ based model in accordance with certain embodiments herein uses a separate texture normalization method which is, as described below, a more suitable approach for color images.

Moreover, by employing the $I_1I_2I_3$ color space, a more efficient compaction of the color texture data is achieved. As the texture subvectors corresponding to $I_1$, $I_2$, and $I_{13}$ channels are significant in the order of $\approx 76\%$, $\approx 20\%$, and $\approx 4\%$, one can retain about 96% of the useful fitting information out of the first two texture sub-vectors only. Thus, a reduced $I_1I_2$ model can be designed with the performance comparable to a full $I_1I_2I_3$ model in terms of final convergence accuracy. Combined with the normalization method of separate texture sub-vectors in accordance with certain embodiments, a reduced $I_1I_2$ model is still more accurate than the original RGB model while the computational requirements are reduced by approximately one third.

A detailed discussion of results, summarized in Tables I to VI, now follows.

EXPERIMENTS

The performance of several models were analyzed in the color spaces discussed above. Both texture normalization techniques described were tested for face structure modeling. Use was made in tests of the appearance modeling environment FAME [15], modifying and extending it to accommodate the techniques described herein.

The convergence rates of AAMs are not specifically addressed herein. However, this work is envisioned to move towards real-time embodiments in embedded imaging applications.

The performance of the models is presented in terms of their final convergence accuracy. Several measures are used to describe the convergence accuracy of the models and their ability to synthesize the face. These are the point-to-point (PtPt) and point-to-curve (PtCrv) boundary errors, and the texture error. The boundary errors are measured between the exact shape in the image frame (obtained from the ground truth annotations) and the optimized model shape in the image frame. The point-to-point error is given by the Euclidian distance between the two shape vectors of concatenated x and y coordinates of the landmark points. The point-to-curve error is calculated as the Euclidian norm of the vector of distances from each landmark point of the exact shape to the closest point on the associated border of the optimized model shape in the image frame. The mean and standard deviation of PtPt and PtCrv are used to evaluate the boundary errors over a whole set of images. The texture error is computed as the Euclidian distance between the texture vector corresponding to the original image and the synthesized texture vector after texture de-normalization. This error is evaluated inside the CIELAB color space in order to have a qualitative differentiation between the synthesized images which is in accordance with the human perception. This is called the perceptual color texture error (PTE).

Two standard face image databases were used, namely the CMU PIE database [16] and the IMM database [17]. Color images of individuals with full frontal pose, neutral expression, no glasses, and diffuse light were used in these tests. Thus, a set of 66 images (640×486 pixels) was taken from the entire PIE database and a second set of 37 images (640×480 pixels) from the IMM database. These reduced sets of images are referred to below when mentioning the PIE and IMM databases. The images were manually annotated using 65 landmark points as shown in FIG. 1. Although the images in the IMM database were available with an attached set of annotations, it was decided to build an annotation set for reasons of consistency between the two image test sets.

For the PIE database, the first 40 images were used in building the models. The convergence accuracy was tested on the same set of 40 images, called PIE Subset 1 or seen data, and separately on the remaining 26 images, called PIE Subset 2 or unseen data. The IMM database was similarly split into IMM Subset 1, containing the first 20 images (seen data), and IMM Subset 2 with the remaining 17 images (unseen data). By doing this, how well the models are able to memorize a set of examples was analyzed, and also their capability to generalize to new examples. All models were built so as to retain 95% of the variation both for shape and texture, and again 95% of the combined (appearance) variation. For cross-validation, the PIE models were applied on the full IMM database, as well as the IMM models on the full PIE database.

The following AAM implementations were analyzed:
standard grayscale model (Grayscale);
RGB model with global color texture normalization (RGB GN);
and the proposed models,
CIELAB model with global texture normalization (CIELAB GN);
$I_1I_2I_3$ model with texture normalization on separate channel sub-vectors ($I_1I_2I_3$ SChN);
$I_1I_2$ model with texture normalization on separate channel sub-vectors ($I_1I_2$ SChN);
and also the remaining (color space)/(normalization method) possibilities were added to provide a complete comparative analysis,
RGB model with texture normalization on separate channel sub-vectors (RGB SChN);
CIELAB model with texture normalization on separate channel sub-vectors (CIELAB SChN);
$I_1I_2I_3$ model with global texture normalization ($I_1I_2I_3$GN);
$I_1I_2$ model with global texture normalization ($I_1I_2$ GN).
The grayscale images were obtained from the RGB images by applying the following standard mix of RGB channels, $$\text{Grayscale} = 0.30R + 0.59G + 0.11B. \quad (19)$$

The testing procedure for each model is as follows: each model is initialized using an offset for the centre of gravity of the shape of 20 pixels on the x coordinate and 10 pixels on the y coordinate from the optimal position in the query image. The optimization algorithm (see above) is applied, and the convergence accuracy is measured. Convergence is declared successful if the point-to-point boundary error is less than 10 pixels.

Figure 2:
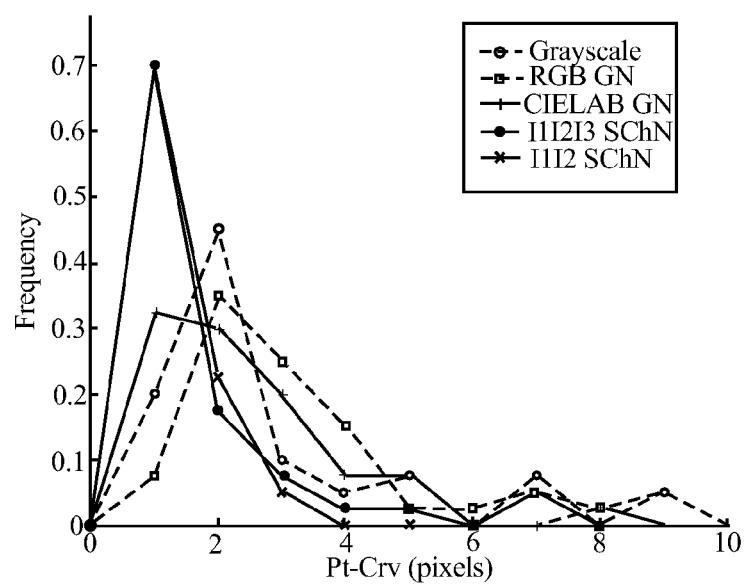
FIG. 2 includes histogram plots of point-to-curve boundary errors after applying the (PIE) models on PIE subset 1 (seen images).

FIG. 2 and FIG. 4 present a histogram of PtCrv errors for landmark points on PIE database for the seen and unseen subsets, respectively. It can be observed that these errors are concentrated within lower values for the proposed models, showing improved convergence accuracy. As expected, better accuracy is obtained for the seen subset. FIG. 3 and FIG. 5 present the dependency of the declared convergence rate on the imposed threshold on PIE database for the seen and unseen data, respectively. This shows again the superiority of the proposed implementations.

In order to provide an indication on the relevancy of the chosen (−20,−10) pixels initial displacement, as well as to have an indication on the convergence range differences between the models, convergence accuracy was studied for a wider range of initial displacements on the x coordinate (dx), keeping the −10 pixels displacement on the y coordinate fixed. The tests were performed on PIE Subset 2 (unseen data) and are presented in FIG. 6-FIG. 8 for the three main model implementations. The figures show diagrams of actual vs. predicted displacements on a range of −60 to 60 pixels from the optimum position. The predicted displacements are averaged with respect to all images in the analyzed dataset. The vertical segments represent one unit of standard deviation of each predicted displacement for the analyzed dataset of images. The converge range, given by the linear part of the diagram, is rather similar for multiple three model implementations. The RGB GN model seems to be able to converge for some larger displacements as well, yet the standard deviation of the predicted displacements rapidly increases with distance, which shows that the convergence accuracy is lost. On the other hand, although the CIELAB GN and $I_1I_2I_3$ SChN models have a more abrupt delimitation of their convergence range, they present a small and constant standard deviation inside their linear range, which shows a more consistent and accurate convergence. Also, the (20,10) pixels initial displacement, applied for all the other tests, is well inside the normal convergence range for any of the three models, which validates the choice made.

In FIG. 9 and FIG. 10 a comparative block diagram is presented of average PtPt errors on three different image datasets for the PIE models and IMM models, respectively. Note that these errors are consistently low (across all datasets) for the $I_1I_2I_3$ and the reduced $I_1I_2$ models with texture normalization on separate channel subvectors.

From Table I Table VI, the successful convergence rate for the three proposed models is consistently the best in comparison to all other model implementations, being usually much higher than for the grayscale model. An inconclusive result was obtained for IMM database (Table III and Table IV), where most of the studied models converged successfully on all images. Interestingly, it can be noticed that the RGB GN model does not outperform the grayscale model, the successful convergence rate being actually lower for some of the studied cases. In particular, for the cross-validation tests, when applying the PIE models on IMM database (Table V), the RGB GN model has a very poor rate, being actually outperformed by all other model implementations. For the same situation, all three proposed models have very high convergence rates, particularly the $I_1I_2I_3$ SChN model which registered a rate of 100%. Notable results were also obtained for the case of applying IMM models on PIE database (Table VI).

In terms of convergence accuracy (PtPt, PtCrv) and perceptual texture error, it can be seen that the CIELAB implementation is still dependent to some extent on the image acquisition conditions. This is caused by the limitation of the CIELAB implementation which cannot be efficiently used with texture normalization on separate channel sub-vectors. Some redundancy of RGB coordinates is removed by separating intensity and chromaticity data, yet the components are still coupled during texture normalization. Thus, although the results are improved over the RGB implementation for many of the tested image datasets, especially for the cross-validation tests (Table V and Table VI), they seem to lack consistency (see Table III and Table IV).

Much more consistent results were obtained for $I_1I_2I_3$ SChN and $I_1I_2$ SChN models, where the convergence accuracy is significantly improved over the RGB GN implementation for all studied datasets. For $I_1I_2I_3$ SChN model the perceptual texture error is also notably reduced for all datasets.

TABLE I

CONVERGENCE RESULTS ON (PIE) SUBSET 1 (Seen)

| Model | Success [%] | Pt-Crv (Mean/Std) | Pt—Pt (Mean/Std) | PTE (Mean/Std) |
|---|---|---|---|---|
| Grayscale | 87.50 | 2.98/2.17 | 5.05/5.63 | — |
| RGB GN | 85.00 | 3.33/2.01 | 5.68/5.70 | 5.73/2.15 |
| CIELAB GN | 97.50 | 2.38/1.47 | 3.48/2.13 | 4.85/1.19 |
| I1I2I3 SChN | 100 | 1.54/0.88 | 2.34/1.15 | 4.26/0.89 |
| I1I2 SChN | 97.50 | 1.63/1.30 | 2.68/2.79 | 5.96/1.51 |
| RGB SChN | 90.00 | 2.54/2.54 | 4.78/6.89 | 5.20/2.47 |
| CIELAB SChN | 97.50 | 1.71/1.56 | 3.03/3.62 | 4.59/1.72 |
| I1I2I3 GN | 87.50 | 3.08/1.80 | 4.97/4.47 | 5.50/1.94 |
| I1I2 GN | 92.50 | 2.52/1.66 | 4.15/4.41 | 6.62/1.88 |

TABLE II

CONVERGENCE RESULTS ON (PIE) SUBSET 2 (Unseen)

| Model | Success [%] | Pt-Crv (Mean/Std) | Pt—Pt (Mean/Std) | PTE (Mean/Std) |
|---|---|---|---|---|
| Grayscale | 88.46 | 3.93/2.00 | 6.91/5.45 | — |
| RGB GN | 80.77 | 3.75/1.77 | 7.09/4.99 | 7.20/2.25 |
| CIELAB GN | 100 | 2.70/0.93 | 4.36/1.63 | 5.91/1.19 |
| I1I2I3 SChN | 100 | 2.60/0.93 | 4.20/1.45 | 5.87/1.20 |
| I1I2 SChN | 96.15 | 2.76/1.11 | 4.70/2.31 | 6.95/1.37 |
| RGB SChN | 73.08 | 4.50/2.77 | 8.73/7.20 | 7.25/2.67 |
| CIELAB SChN | 88.46 | 3.51/2.91 | 6.70/8.29 | 6.28/2.09 |
| I1I2I3 GN | 92.31 | 3.23/1.21 | 5.55/2.72 | 6.58/1.62 |
| I1I2 GN | 88.46 | 3.30/1.37 | 5.84/3.55 | 7.49/1.70 |

TABLE III

CONVERGENCE RESULTS ON (IMM) SUBSET 1 (Seen)

| Model | Success [%] | Pt-Crv (Mean/Std) | Pt—Pt (Mean/Std) | PTE (Mean/Std) |
|---|---|---|---|---|
| Grayscale | 100 | 1.19/0.37 | 1.70/0.38 | — |
| RGB GN | 100 | 0.87/0.19 | 1.30/0.29 | 2.22/0.51 |
| CIELAB GN | 100 | 1.36/0.72 | 1.99/1.09 | 2.63/1.02 |
| I1I2I3 SChN | 100 | 0.78/0.20 | 1.21/0.31 | 2.06/0.44 |
| I1I2 SChN | 100 | 0.77/0.19 | 1.21/0.29 | 11.88/2.31 |
| RGB SChN | 100 | 0.88/0.36 | 1.31/0.42 | 2.02/0.44 |
| CIELAB SChN | 95.00 | 1.49/2.03 | 3.30/7.68 | 2.99/2.28 |
| I1I2I3 GN | 100 | 1.19/0.57 | 1.71/0.80 | 2.49/0.87 |
| I1I2 GN | 100 | 1.09/0.44 | 1.61/0.67 | 12.00/2.27 |

TABLE IV

CONVERGENCE RESULTS ON (IMM) SUBSET 2 (unseen)

| Model | Success [%] | Pt-Crv (Mean/Std) | Pt—Pt (Mean/Std) | PTE (Mean/Std) |
|---|---|---|---|---|
| Grayscale | 100 | 3.03/1.38 | 4.27/1.54 | — |
| RGB GN | 100 | 2.97/1.24 | 4.25/1.38 | 4.96/1.10 |
| CIELAB GN | 100 | 3.05/1.12 | 4.21/1.12 | 4.47/0.77 |
| I1I2I3 SChN | 100 | 2.82/1.40 | 4.12/1.34 | 4.43/0.80 |
| I1I2 SChN | 100 | 2.86/1.54 | 4.21/1.54 | 12.14/2.67 |
| RGB SChN | 100 | 2.88/1.17 | 4.20/1.38 | 4.28/0.74 |
| CIELAB SChN | 94.12 | 3.37/2.17 | 5.39/4.72 | 4.93/1.75 |
| I1I2I3 GN | 100 | 3.06/1.04 | 4.31/1.15 | 4.91/1.13 |
| I1I2 GN | 100 | 2.96/1.09 | 4.20/1.22 | 12.26/2.64 |

TABLE V

CONVERGENCE RESULTS FOR PIE MODELS ON IMM DB

| Model | Success [%] | Pt-Crv (Mean/Std) | Pt—Pt (Mean/Std) | PTE (Mean/Std) |
|---|---|---|---|---|
| Grayscale | 21.62 | 9.13/3.76 | 24.26/14.36 | — |
| RGB GN | 5.41 | 9.27/1.77 | 19.99/4.86 | 11.68/1.57 |
| CIELAB GN | 94.59 | 4.00/1.02 | 6.69/1.85 | 9.92/0.94 |
| I1I2I3 SChN | 100 | 3.73/0.94 | 5.55/1.22 | 6.07/1.14 |
| I1I2 SChN | 94.59 | 4.69/1.40 | 7.10/2.08 | 12.89/2.29 |
| RGB SChN | 10.81 | 10.07/4.28 | 22.41/14.64 | 10.05/1.53 |
| CIELAB SChN | 48.65 | 8.78/4.72 | 20.37/18.11 | 8.94/3.04 |
| I1I2I3 GN | 59.46 | 5.17/1.56 | 10.84/5.07 | 10.24/1.31 |
| I1I2 GN | 51.35 | 5.35/1.65 | 11.96/5.24 | 15.11/2.20 |

TABLE VI

CONVERGENCE RESULTS FOR IMM MODELS ON PIE DB

| Model | Success [%] | Pt-Crv (Mean/Std) | Pt—Pt (Mean/Std) | PTE (Mean/Std) |
|---|---|---|---|---|
| Grayscale | 36.36 | 6.90/3.33 | 16.07/10.70 | — |
| RGB GN | 36.36 | 7.18/2.82 | 15.73/7.83 | 17.06/3.15 |
| CIELAB GN | 72.73 | 5.83/2.31 | 10.84/7.85 | 10.35/2.61 |
| I1I2I3 SChN | 65.15 | 5.52/3.24 | 12.11/9.84 | 9.05/2.83 |
| I1I2 SChN | 56.06 | 6.07/3.47 | 13.87/11.42 | 9.98/2.73 |
| RGB SChN | 36.36 | 7.06/3.20 | 16.43/9.77 | 8.64/2.32 |
| CIELAB SChN | 13.64 | 8.62/2.49 | 21.16/7.98 | 9.62/2.22 |
| I1I2I3 GN | 34.85 | 7.65/3.05 | 18.02/12.14 | 12.84/3.09 |
| I1I2 GN | 25.76 | 8.83/4.74 | 26.35/31.15 | 11.65/3.39 |

DISCUSSION AND CONCLUSIONS

The embodiments described above have been analyzed with respect to how changes in color space representation of an image influence the convergence accuracy of AAMs. In particular, AAMs have been compared that have been built using RGB, CIELAB and $I_1I_2I_3$ color spaces. Both of the latter color spaces provide a more natural separation of intensity and chromaticity information than RGB. The $I_1I_2I_3$ color space also enables the application of more suitable color texture normalization and as a consequence model convergence is significantly improved.

From described experiments, it was deduced that it would make sense to normalize each color channel independently, rather than applying a global normalization across all three channels.

Thus, a more natural color texture normalization technique is proposed in certain embodiments, where each texture subvector corresponding to an individual color channel is normalized independently of the other channels. Although this approach cannot be successfully used with the common RGB representation, it was determined that some significant results can be achieved in color spaces where intensity and chromaticity information are better separated. In particular, it was found that the $I_1I_2I_3$ color space, which was specifically designed to minimize cross-correlation between the color channels, is an advantageously practical choice for this purpose.

Also, applying the same normalization as for grayscale images on an RGB color texture vector can occasionally lead to decreased convergence accuracy, as suggested in earlier research [8]. Thus, there is little rationale to use an RGB based model as the additional color data does not reliably improve model convergence and it will take three times as long to perform matching operations. For these reasons, the common RGB extension of the basic AAM is only interesting for the purpose of rendering the full color information.

Yet, by employing the $I_1I_2I_3$ color space coupled with texture normalization on separate channel subvectors, significant improvement in convergence accuracy is achieved as well as an accurate reconstruction of the current color image. The reconstruction accuracy, determined by analyzing the mean texture error, is also improved when compared with models based on other color spaces. By using the proposed $I_1I_2I_3$ model with texture normalization on separate channel subvectors, the optimization algorithm, which is typically based on a gradient descent approximation, is less susceptible to errors caused by local error function minima. Thus, the algorithm performance is also noticeably more robust.

More than 96% of relevant data is encapsulated in the $I_1$ and $I_2$ components of the $I_1I_2I_3$ color space. The difference between using an AAM derived from a full $I_1I_2I_3$ color space representation and one which is built by retaining only the first two channels is not very significant. Where the speed of convergence is most important, the reduced $I_1I_2$ model might be favored to a full $I_1I_2I_3$ model due to the lower dimensionality of the overall texture vector and the reduced computational requirements of this two-channel model.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, as well as US published patent applications nos. 2006/0204110, 2006/0204110, 2006/0098890, 2005/0068446, 2006/0039690, and 2006/0285754, and U.S. Pat. Nos. 7,315,631, 7,844,076, and U.S. patent applications Nos. 60/804,546, 60/829,127, 60/773,714, 60/803,980, 60/821,956, and 60/821,165, which are to be or are assigned to the same assignee, are all hereby incorporated by reference into the detailed description of the preferred embodiments as disclosing alternative embodiments and components.

In addition, the following United States published patent applications are hereby incorporated by reference for all purposes including into the detailed description as disclosing alternative embodiments:

[1] G. J. Edwards, C. J. Taylor, and T. F. Cootes, "Interpreting face images using active appearance models," in Proc. 3rd IEEE International Conference on Face & Gesture Recognition (FG '98), 1998, pp. 300-305.

[2] T. F. Cootes and C. J. Taylor, "On representing edge structure for model matching," in Proc. IEEE Computer Vision and Pattern Recognition (CVPR'01), 2001, pp. 1114-1119.

[3] X. Hou, S. Z. Li, H. Zhang, and Q. Cheng, "Direct appearance models." in IEEE Conf. on Computer Vision and Pattern Recognition (CVPR), 2001, pp. 828-833.

[4] T. F. Cootes, G. J. Edwards, and C. J. Taylor, "A comparative evaluation of active appearance model algorithms." in Proc. 9th British Machine Vison Conference. British Machine Vision Association, 1998, pp. 680-689.

[5] R. Donner, M. Reiter, G. Langs, P. Peloschek, and H. Bischof, "Fast active appearance model search using canonical correlation analysis," IEEE Trans. Pattern Anal. Mach. Intell., vol. 28, no. 10, pp. 1690-1694, 2006.

[6] I. Matthews and S. Baker, "Active appearance models revisited," International Journal of Computer Vision, vol. 60, no. 2, pp. 135-164, November 2004, in Press.

[7] G. J. Edwards, T. F. Cootes, and C. J. Taylor, "Advances in active appearance models," in International Conference on Computer Vision (ICCV'99), 1999, pp. 137-142.

[8] M. B. Stegmann and R. Larsen, "Multiband modelling of appearance," Image and Vision Computing, vol. 21, no. 1, pp. 61-67, January 2003. [Online]. Retrieved from the world wide web at www2 dot imm dot dtu dot dk forward slash pubdb forward slash p dot php? 1421

[9] C. Goodall, "Procrustes methods in the statistical analysis of shape," Journal of the Royal Statistical Society B, vol. 53, no. 2, pp. 285-339, 1991.

[10] A. U. Batur and M. H. Hayes, "Adaptive active appearance models." IEEE Transactions on Image Processing, vol. 14, no. 11, pp. 1707-1721, 2005.

[11] G. Sharma and H. J. Trussell, "Digital color imaging," IEEE Transactions on Image Processing, vol. 6, no. 7, pp. 901-932, 1997. [Online]. Available: citeseer.ist.psu.edu/sharma97digital.html

[12] M. Tkalcic and J. F. Tasic, "Colour spaces perceptual, historical and applicational background," in IEEE, EUROCON, 2003.

[13] Y. Ohta, T. Kanade, and T. Sakai, "Color information for region segmentation," in Computer Graphics and Image Processing, no. 13, 1980, pp. 222-241.

[14] J. J. Gerbrands, "On the relationships between SVD, KLT and PCA." Pattern Recognition, vol. 14, no. 16, pp. 375-381, 1981.

[15] M. B. Stegmann, B. K. ErsbØll, and R. Larsen, "FAME a flexible appearance modelling environment," IEEE Transactions on Medical Imaging, vol. 22, no. 10, pp. 1319-1331, 2003. [Online]. Retrieved from the world wide web at www2 dot imm dot dtu dot dk forward slash pubdb forward slash p dot php? 1918

[16] T. Sim, S. Baker, and M. Bsat, "The CMU pose, illumination, and expression (PIE) database of human faces," Robotics Institute, Carnegie Mellon University, Pittsburgh, Pa., Tech. Rep. CMURITR0102, January 2001.

[17] M. M. NordstrØ, M. Larsen, J. Sierakowski, and M. B. Stegmann, "The IMM face database an annotated dataset of 240 face images," Informatics and Mathematical Modelling, Technical University of Denmark, DTU, Richard Petersens Plads, Building 321, DK2800 Kgs. Lyngby, Tech. Rep., may 2004. [Online]. Retrieved from the world wide web at www2 dot imm dot dtu dot dk forward slash pubdb forward slash p dot php?3160

What is claimed is:

1. A method of detecting faces in a digital image, comprising:
   (a) acquiring a digital color image;
   (b) applying an active appearance model (AAM) including an interchannel-decorrelated color space;
   (c) matching one or more parameters of the model to the image; and
   (d) communicating a face detection result based on the matching or a different processing result incorporating said face detection result, or both.

2. The method of claim 1, further comprising converting RGB data to I1I2I3 color space.

3. The method of claim 2, wherein the converting comprises linear conversion.

4. The method of claim 2, further comprising representing texture with the I1I2I3 color space.

5. The method of claim 4, further comprising aligning the texture on separate channels.

6. The method of claim 4, further comprising performing operations on the texture data on each channel separately.

7. The method of claim 1, wherein said interchannel-decorrleated color space comprises at least three channels including a luminance channel and two chromatic channels.

8. The method of claim 1, wherein the AAM comprises an application of principal components analysis (PCA).

9. The method of claim 8, wherein said PCA comprises eigen-analysis of dispersions of shape, texture and appearance.

10. The method of claim 8, wherein the AAM further comprises an application of generalized procrustes analysis (GPA) including aligning shapes.

11. The method of claim 10, wherein the AAM further comprises a model of shape variability including an application of PCA on a set of shape vectors.

12. The method of claim 11, wherein the AAM further comprises a normalization of objects within the image with respect to shape.

13. The method of claim 12, wherein the AAM further comprises generation of a texture model including sampling intensity information from each shape-free image to form a set of texture vectors.

14. The method of claim 13, wherein the generation of the texture model comprising normalization of the set of texture vectors and application of PCA on the normalized texture vectors.

15. The method of claim 14, wherein the applying comprises retaining only the first one or two of the aligned texture vectors.

16. The method of claim 14, wherein the AAM further comprises generation of a combined appearance model including a combined vector from weighted shape parameters concatenated to texture parameters, and application of PCA to the combined vector.

17. The method of claim 1, wherein the matching comprising a regression approach.

18. The method of claim 1, wherein the matching comprises finding model parameters or pose parameters or both.

19. The method of claim 18, wherein the pose parameters comprise translation, scale or rotation, or combinations thereof.

20. The method of claim 1, wherein said interchannel-decorrelated color space comprises an orthogonal color space.

21. The method of claim 1, wherein effects of global lighting and chrominance variations are reduced with said AAM.

22. The method of claim 1, further comprising tracking one or more detected faces through a series of two or more images.

23. An apparatus for detecting faces in a digital image, comprising a processor and one or more processor-readable media programming the processor to control the apparatus to perform a method comprising:
   (a) acquiring a digital color image;
   (b) applying an active appearance model (AAM) including an interchannel-decorrelated color space;
   (c) matching one or more parameters of the model to the image; and
   (d) communicating a face detection result based on the matching or a different result incorporating said face detection result, or both.

24. The apparatus of claim 23, wherein the method further comprises converting RGB data to I1I2I3 color space.

25. The apparatus of claim 24, wherein the converting comprises linear conversion.

26. The apparatus of claim 24, wherein the method further comprises representing texture with the I1I2I3 color space.

27. The apparatus of claim 26, wherein the method further comprises aligning the texture on separate channels.

28. The apparatus of claim 26, wherein the method further comprises performing operations on the texture data on each channel separately.

29. The apparatus of claim 23, wherein said interchannel-decorrleated color space comprises at least three channels including a luminance channel and two chromatic channels.

30. The apparatus of claim 23, wherein the AAM comprises an application of principal components analysis (PCA).

31. The apparatus of claim 30, wherein said PCA comprises eigen-analysis of dispersions of shape, texture and appearance.

32. The apparatus of claim 30, wherein the AAM further comprises an application of generalized procrustes analysis (GPA) including aligning shapes.

33. The apparatus of claim 32, wherein the AAM further comprises a model of shape variability including an application of PCA on a set of shape vectors.

34. The apparatus of claim 33, wherein the AAM further comprises a normalization of objects within the image with respect to shape.

35. The apparatus of claim 34, wherein the AAM further comprises generation of a texture model including sampling intensity information from each shape-free image to form a set of texture vectors.

36. The apparatus of claim 35, wherein the generation of the texture model comprising normalization of the set of texture vectors and application of PCA on the normalized texture vectors.

37. The apparatus of claim 36, wherein the applying comprises retaining only the first one or two of the aligned texture vectors.

38. The apparatus of claim 36, wherein the AAM further comprises generation of a combined appearance model including a combined vector from weighted shape parameters concatenated to texture parameters, and application of PCA to the combined vector.

39. The apparatus of claim 23, wherein the matching comprising a regression approach.

40. The apparatus of claim 23, wherein the matching comprises finding model parameters or pose parameters or both.

41. The apparatus of claim 40, wherein the pose parameters comprise translation, scale or rotation, or combinations thereof.

42. The apparatus of claim 23, wherein said interchannel-decorrelated color space comprises an orthogonal color space.

43. The apparatus of claim 23, wherein effects of global lighting and chrominance variations are reduced with said AAM.

44. The apparatus of claim 23, wherein the method further comprises tracking one or more detected faces through a series of two of more images.

* * * * *